United States Patent
Blauvelt et al.

(10) Patent No.: US 7,136,564 B2
(45) Date of Patent: *Nov. 14, 2006

(54) WAVEGUIDES ASSEMBLED FOR TRANSVERSE-TRANSFER OF OPTICAL POWER

(75) Inventors: Henry A. Blauvelt, San Marino, CA (US); David W. Vernooy, Sierra Madre, CA (US); Joel S. Paslaski, Alhambra, CA (US); Guido Hunziker, Altadena, CA (US)

(73) Assignee: Xponent Photonics Inc, Monrovia, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/298,264

(22) Filed: Dec. 9, 2005

(65) Prior Publication Data

US 2006/0088266 A1    Apr. 27, 2006

Related U.S. Application Data

(63) Continuation of application No. 10/609,018, filed on Jun. 27, 2003, now Pat. No. 6,975,798.

(60) Provisional application No. 60/466,799, filed on Apr. 29, 2003, provisional application No. 60/393,974, filed on Jul. 5, 2002.

(51) Int. Cl.
   *G02B 6/10*    (2006.01)
(52) U.S. Cl. .......................... 385/129; 385/50; 385/30; 385/139
(58) Field of Classification Search ................. 385/39, 385/50, 129, 130
   See application file for complete search history.

(56) References Cited

U.S. PATENT DOCUMENTS

| | | | |
|---|---|---|---|
| 4,799,749 A | 1/1989 | Borner et al. | |
| 5,159,699 A | 10/1992 | de Monts | |
| 6,282,335 B1 | 8/2001 | Losch et al. | |
| 6,385,376 B1 | 5/2002 | Bowers et al. | |
| 6,411,765 B1 | 6/2002 | Ono | |
| 6,487,350 B1 | 11/2002 | Veligdan et al. | |
| 6,575,798 B1 * | 6/2003 | Maurel | 441/75 |
| 6,744,953 B1 | 6/2004 | Lemoff et al. | |
| 6,975,798 B1 * | 12/2005 | Blauvelt et al. | 385/50 |
| 2002/0037141 A1 | 3/2002 | Miyamoto et al. | |
| 2003/0039439 A1 | 2/2003 | Deliwata | |
| 2003/0081902 A1 | 5/2003 | Blauvelt et al. | |
| 2003/0235369 A1 | 12/2003 | Grosjean et al. | |
| 2003/0235371 A1 | 12/2003 | Shimeda et al. | |
| 2004/0052480 A1 | 3/2004 | Benzoni et al. | |
| 2004/0218849 A1 | 11/2004 | Blauvelt et al. | |
| 2004/0264905 A1 | 12/2004 | Blauvelt et al. | |

FOREIGN PATENT DOCUMENTS

WO     WO 02/21176 A    3/2002

OTHER PUBLICATIONS

International Search Report for PCT App. No. PCT/US2003/020330, Jan. 8, 2004.

(Continued)

*Primary Examiner*—Ellen E. Kim
(74) *Attorney, Agent, or Firm*—David S. Alavi; Christie, Parker & Hale LLP

(57) ABSTRACT

Formation of a substantially flat upper cladding surface over a waveguide core facilitates transverse-coupling between assembled waveguides, and/or provides mechanical alignment and/or support. An embedding medium may be employed for securing optical assemblies and protecting optical surfaces thereof. Structural elements fabricated with a low-profile core may be employed for providing mechanical alignment and/or support, aiding in the encapsulation process, and so forth.

28 Claims, 15 Drawing Sheets

OTHER PUBLICATIONS

Hilleringmann et al, Optoelectronic System Integration on Silicon:Waveguides, Photodetectors, and VLSI CMOS Circuits on One Chip, IEEE Transactions on Electron Devices, May 1995, pp. 841-846, vol. 42, No. 5.

Hoffman et al, Low-Loss Fiber-Matched Low-Temperature PECVD Waveguides with Small-Core Dimensions for Optical Communications Systems, IEEE Photonics Technology Letters, Sep. 1997, pp. 1238-1240, vol. 9, No. 9.

Horst et al, Compact, Tunable Optical Devices in Silicon-Oxynitride Waveguide Technology, Proc. Topical Meeting on Integrated Photonics Research, IPR 2000, 1999, Published in: Quebec Canada.

Kimerling, Photons to the Rescue: Microelectronics Becomes Microphotonics, Interface, Jun. 2000, pp. 28-31, Volume Summer 2000, Publisher: The Electrochemical Society.

Liu et al, Fused InP-GaAs Vertical Coupler Filters, IEEE Photonics Technology Letters, Jan. 1999, pp. 93-95, vol. 11, No. 1.

Li et al, Silicon Optical Bench Waveguide Technology, Optical Fiber Telecommunications, 1997, pp. 319-376, vol. IIIB, Publisher: Academic Press, Published in: US.

Li et al, Silica-based optical integrated circuits, IEE Proc.-Optoelectron., Oct. 1996, pp. 263-280, vol. 143, No. 5.

Offrein et al. Resonant Coupler-Based Tunable Add-After-Drop Filter in Silicon-Oxynitride Technology for WDM Networks, IEEE Journal of Selected Topics in Quantum Electronics, Sep. 1999, pp. 1400-1406, vol. 5, No. 5.

De Ridder et al, Silicon Oxynitride Planar Waveguiding Structure for Application in Optical Communication, IEEE Journal of Selected Topics in Quantum Electronics, Nov. 1998, pp. 930-937, vol. 4, No. 6.

Shani et al, Efficient coupling of a semiconductor laser to an otpical fiber by means of a tapered waveguide on silicon, Applied Physics Letters, Dec. 4, 1998, pp. 2389-2391, vol. 55, No. 23.

\* cited by examiner

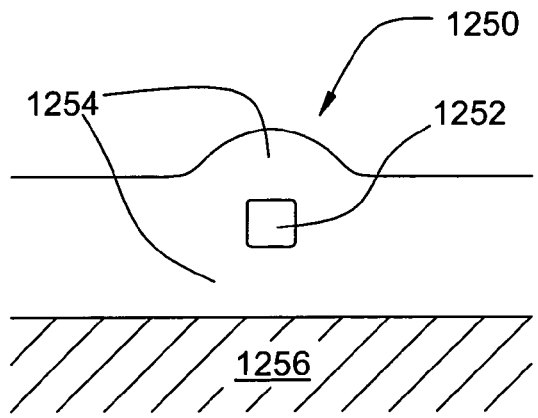
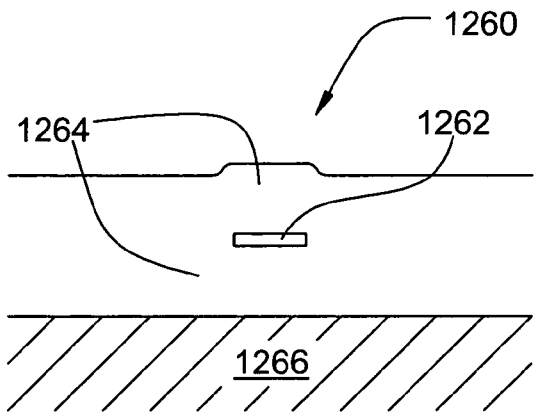
FIG. 3A  FIG. 3B
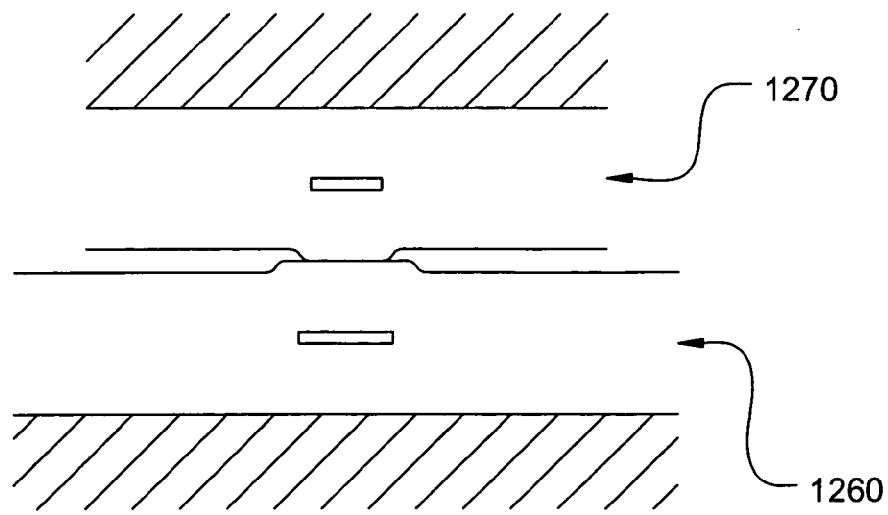
FIG. 3C

US 7,136,564 B2

WAVEGUIDES ASSEMBLED FOR TRANSVERSE-TRANSFER OF OPTICAL POWER

BENEFIT CLAIMS TO RELATED APPLICATIONS

This application is a continuation of U.S. non-provisional application Ser. No. 10/609,018 filed Jun. 27, 2003 (now U.S. Pat. No. 6,975,798 issued Dec. 13, 2005), which in turn claims benefit of U.S. provisional App. No. 60/393,974 filed Jul. 5, 2002 and U.S. provisional App. No. 60/466,799 filed Apr. 29, 2003. Said patent and each of said provisional and non-provisional applications are hereby incorporated by reference as if fully set forth herein.

BACKGROUND

The field of the present invention relates to optical waveguides. In particular, various adaptations are disclosed herein for facilitating assembly of planar optical waveguides for transverse-transfer of optical power therebetween.

This application is related to subject matter disclosed in:

U.S. non-provisional application Ser. No. 10/187,030 entitled "Optical junction apparatus and methods employing optical power transverse-transfer" filed Jun. 28, 2002 in the names of Henry A. Blauvelt, Kerry J. Vahala, David W. Vernooy, and Joel S. Paslaski, said application being hereby incorporated by reference as if fully set forth herein;

U.S. provisional App. No. 60/360,261 entitled "Alignment-insensitive optical junction apparatus and methods employing adiabatic optical power transfer" filed Feb. 27, 2002 in the names of Henry A. Blauvelt, Kerry J. Vahala, David W. Vernooy, and Joel S. Paslaski; and U.S. provisional App. No. 60/334,705 entitled "Integrated end-coupled transverse-optical-coupling apparatus and methods" filed Oct. 30, 2001 in the names of Henry A. Blauvelt, Kerry J. Vahala, Peter C. Sercel, Oskar J. Painter, and Guido Hunziker.

SUMMARY

A first planar optical waveguide includes a first core within lower-index first cladding on a first waveguide substrate. A substantially flat waveguide upper cladding surface is provided over the first core along at least a portion of the length thereof. A second planar optical waveguide includes a second core within lower-index second cladding on a second waveguide substrate. A substantially flat waveguide upper cladding surface is provided over the second core along at least a portion of the length thereof. The first and second planar waveguides are assembled together with at least portions of their corresponding substantially flat waveguide upper cladding surfaces facing one another, thereby positioning the waveguides for transverse-transfer of optical power therebetween along respective transverse-coupled portions of the first and second cores. The waveguide upper cladding surfaces may be positioned against one another upon assembly of the waveguides, or may be spaced apart from one another.

In some embodiments, additional areas of core material may be provided within the cladding so as to provide corresponding structural upper cladding surfaces in a manner similar to that employed for forming the waveguide upper cladding surfaces. The waveguide and structural upper cladding surfaces are substantially parallel, and may in some instances also be substantially coplanar. The structural upper cladding surfaces are positioned against one another upon assembly of the planar waveguides, thereby providing alignment and/or support.

In some embodiments, substantially flat waveguide and structural upper cladding surfaces may be formed by deposition of cladding material over a low-profile core, wherein the width of the core (i.e., the lateral dimension) is larger than the height of the core (i.e., the vertical dimension). Alternatively, substantially flat waveguide and structural upper cladding surfaces may be formed by chemical-mechanical polishing (CMP) or other suitable processing of cladding deposited over a core of any shape.

In some embodiments, an embedding or encapsulating medium may be employed for securing the assembled planar waveguides and protecting various optical surfaces thereof. Structural upper cladding surfaces formed by areas of core material may be employed for aiding in the encapsulation process, by providing mechanical alignment and/or support during the embedding process, and/or by directing flow of embedding material precursor(s) to the appropriate locations about the waveguides. Such embedding may serve as a micro-hermetic package and/or may serve to enhance optical properties/performance of the packaged assembled optical waveguides.

Objects and advantages pertaining to optical waveguides assembled for transverse-coupling as disclosed herein may become apparent upon referring to the disclosed exemplary embodiments as illustrated in the drawings and disclosed in the following written description and/or claims.

BRIEF DESCRIPTION OF THE DRAWINGS

FIGS. 3A–3C are cross-sectional views of optical waveguides.

Figure 1A:
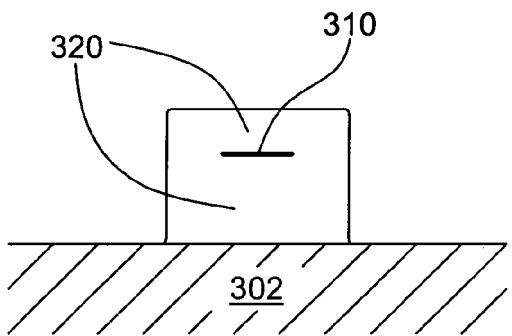
FIGS. 1A–1E are cross-sectional views of exemplary low-profile-core optical waveguides.

The embodiments shown in the Figures are exemplary, and should not be construed as limiting the scope of the present disclosure and/or appended claims. It should be noted that the relative sizes and/or proportions of structures shown in the Figures may in some instances be distorted to facilitate illustration of the disclosed embodiments.

DETAILED DESCRIPTION OF EMBODIMENTS

Low-profile cores as shown in the exemplary waveguides of FIGS. 1A–1E and 2A–2E may offer advantages for fabrication and assembly of transverse-coupled optical waveguides. Once the core material layer for a waveguide is deposited and then patterned to form the core, additional cladding material is typically deposited to continue the fabrication process. Deposition processes typically employed exhibit varying degrees of conformality, and when cladding material is deposited over a waveguide core so that the upper cladding thickness and core height are similar (within about a factor of two, for example), a curved cladding upper surface typically results. For a waveguide core with an aspect ratio (width:height) of less than about 2:1, a majority of the upper cladding surface over the waveguide is typically curved (waveguide 1250, core 1252, and cladding 1254 on substrate 1256, as shown in FIG. 3A). In contrast, under similar circumstances a low-profile core (having an aspect ratio greater than about 2:1 (waveguide 1260, core 1262, cladding 1264, and substrate 1266, as shown in FIG. 3B; other examples shown in FIGS. 1B and 2B) may typically yield an upper cladding surface curved near the lateral edges of the core but substantially flat above a majority (if not all) of the width of the core. The resulting substantially flat waveguide upper cladding surface may facilitate assembly of the waveguide with another similarly fabricated waveguide with their waveguide upper cladding surfaces facing one another (either against one another, as in FIG. 3C, or spaced-apart from one another). The substantially flat waveguide upper cladding surfaces facilitate stable and reproducible positioning of the waveguides for transverse-transfer of optical power.

The substantially uniform thickness of material layer(s) deposited to form waveguide core 1262, and substantially uniform deposition processes available for forming cladding 1264 (and the upper surface thereof) provide several advantages. Over short length scales (a few millimeters or less) the portion of the upper cladding surface directly over the waveguide core 1262 (a waveguide upper cladding surface) is substantially flat and uniform, thereby enabling another waveguide 1270 to be positioned on waveguide 1260 against the upper cladding surface and providing reproducible and stable relative positioning of the two waveguide cores, with negligible intervening space between the waveguide upper cladding surfaces (FIG. 3C). Substantial uniformity of deposition over larger length scales (a few centimeters or more) yields multiple substantially identical waveguides 1260 (including substantially identical upper cladding layers) formed concurrently on a common substrate wafer (wafer-scale fabrication). The optical performance of substantially identical waveguides reproducibly and stably positioned for optical transverse-coupling may therefore be relied on for reliable fabrication and assembly of optical devices.

Transverse-coupled portions of waveguides 1260 and 1270 of FIG. 3C (as well as transverse-coupled portions of other exemplary waveguides described and/or shown herein) may be adapted for substantially modal-index-matched transverse coupling, or may be adapted for substantially adiabatic transverse-coupling. Such adaptations for transverse-coupling are set forth in detail in earlier-cited application Ser. Nos. 10/187,030, 60/360,261, and 60/334,705. One such adaptation for substantially adiabatic coupling is shown in FIGS. 4A–4D, which show a core 1112 of a first waveguide tapering down in width until it terminates, while a core 1122 of a second waveguide, transverse-coupled with the first waveguide, originates at a point below core 1112 and tapers up in width as core 1112 tapers down.

FIGS. 1A–1E show cross sections of exemplary embodiments of a planar optical waveguide including a low-profile core 310. The waveguide is formed on a waveguide substrate 302, typically a substantially planar semiconductor substrate such as silicon. Any suitable waveguide substrate material may be employed, including those listed hereinbelow and equivalents thereof. Core 310 is surrounded by lower-index cladding 320. In the examples of FIGS. 1A–1E, the waveguide core 310 may comprise a thin layer of silicon nitride ($Si_xN_y$; index of about 2) or silicon oxynitride ($SiN_xO_y$), typically ranging between a few tens and a few hundreds of nanometers in thickness (i.e., vertical extent). Cladding 320 in this example may comprise silica or doped silica (index around 1.5), so that these exemplary waveguides are high-index-contrast (defined herein as a core/cladding index contrast greater than about 5%). Other suitable high-index-contrast combinations of core and cladding materials may be equivalently employed, including those listed hereinbelow and equivalents thereof.

For supporting optical modes at typical telecommunications wavelengths (visible and near-infrared), core 310 of the exemplary high-index-contrast waveguide 300 may range between about 0.5 μm and about 8 μm in width (i.e., lateral extent). The particular vertical and lateral extents chosen depend on the desired characteristics of waveguide 300 (described further hereinbelow). A silicon nitride core around 50–100 nm high by about 2–3 μm wide (yielding a transverse mode size of around 1–2 μm high by around 1.5–2 μm wide; mode sizes expressed as $1/e^2$ HW intensity) might be well-suited for spatial-mode-matching with a semiconductor optical device mode, while an even thinner (in vertical extent) silicon nitride core around 5–6 μm wide may be well-suited for spatial-mode-matching with larger optical modes, or for facilitating optical transverse-coupling with another waveguide.

The cladding 320 between substrate 302 and core 310 may be made sufficiently thick so as to reduce or substantially prevent leakage of optical power from waveguide 300 into substrate 302 (within operationally acceptable limits). A lower cladding thickness greater than about 5 μm, typically greater than about 10 μm, may adequately serve this purpose. In embodiments formed on a silicon or other semiconductor substrate, an oxide buffer layer is sometimes provided on the substrate. Such a buffer layer may comprise the lower cladding, or may comprise an upper surface of the substrate on which the lower cladding is deposited. Other suitable structures may be employed for substantially preventing optical leakage from the waveguide into the substrate while remaining within the scope of the present disclosure and/or claims.

The thickness of cladding 320 above core 310 may vary, depending on the intended use of the waveguide. Along portions of the length of the waveguide, the upper cladding may be made sufficiently thick so as to reduce or substantially prevent optical leakage through the upper surface of the waveguide (within operationally acceptable limits), and/or to substantially isolate a supported optical mode from a use environment (within operationally acceptable limits). An upper cladding thickness greater than about 5 μm, typically greater than about 10 μm, may adequately serve this purpose. Along a transverse-coupled portion of the length of the waveguide, a thinner upper cladding layer may be more suitable. Such a thinner upper cladding may typically be less than about 1 μm in vertical extent, and often less than about 0.5 μm in vertical extent, in order to facilitate transverse spatial overlap between optical modes of transverse-coupled waveguides. In other examples, a thin upper cladding layer may be adequate in cases where the waveguide is subsequently embedded or encapsulated in a transparent optical medium having an index less than or about equal to the cladding index. In effect, the embedding medium acts as additional cladding.

Figure 1B:
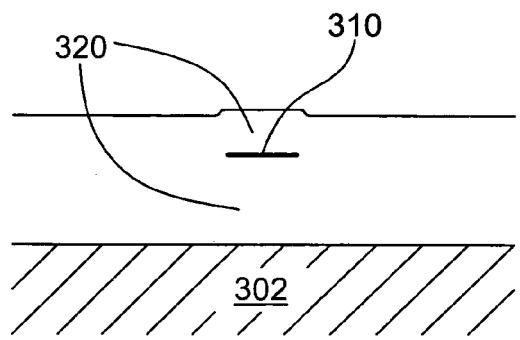
Figure 1C:
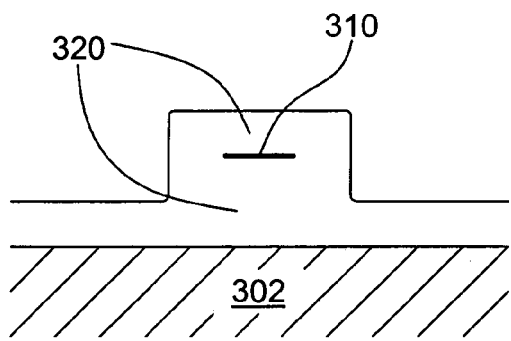
Figure 1D:
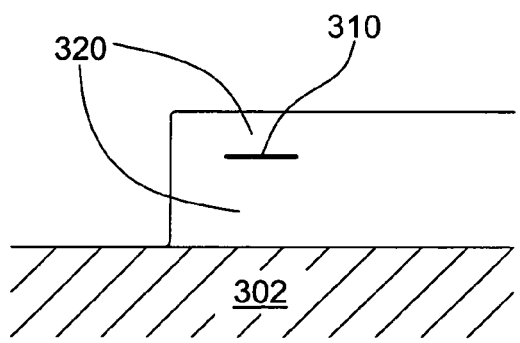
Figure 1E:
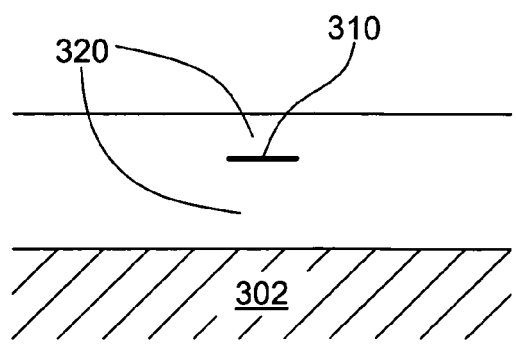
Figure 2A:
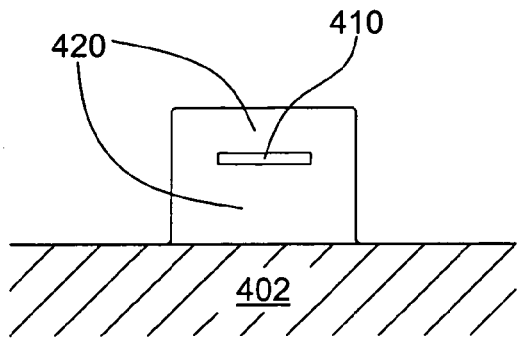
FIGS. 2A–2E are cross-sectional views of exemplary low-profile-core optical waveguides.
Figure 2B:
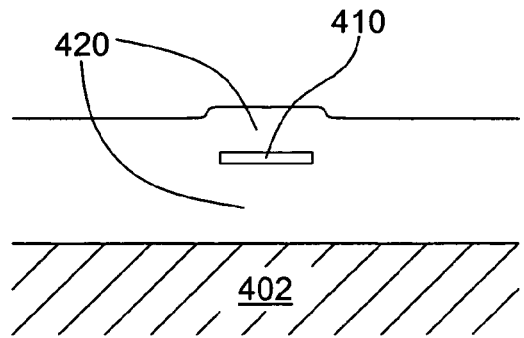
Figure 2C:
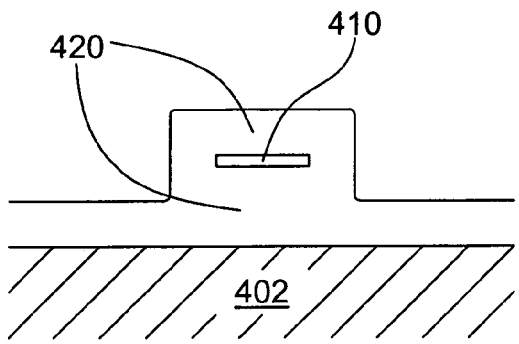
Figure 2D:
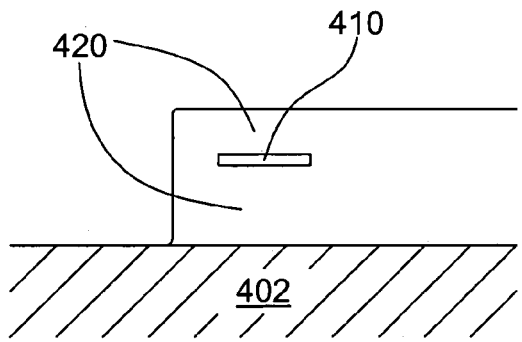
Figure 2E:
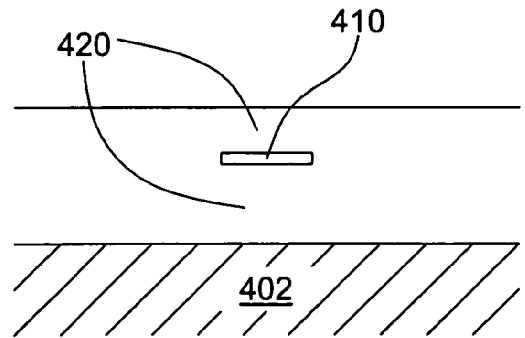
Figure 4A:
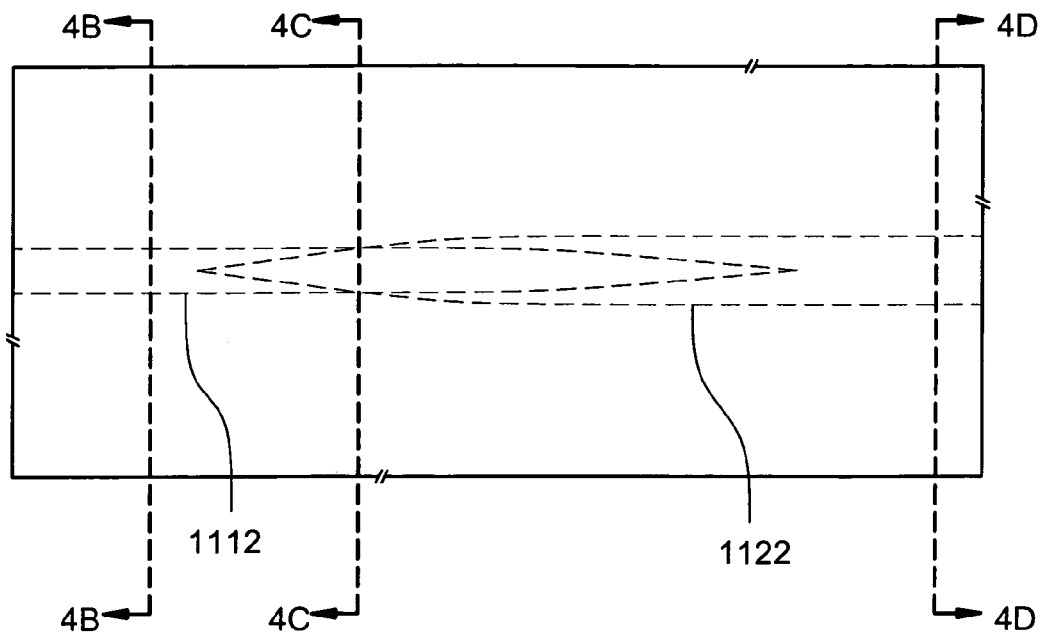
FIGS. 4A–4D are plan and cross-sectional views of assembled optical waveguides.
Figure 4B:
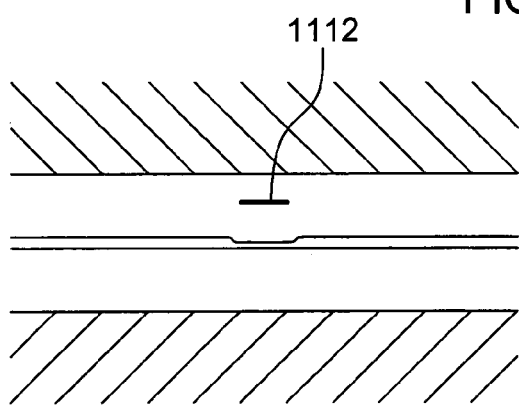
Figure 4C:
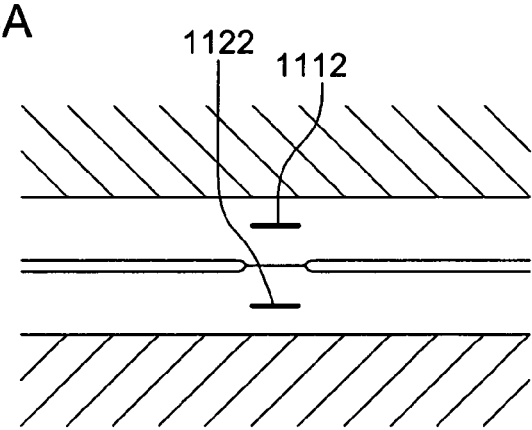
Figure 4D:
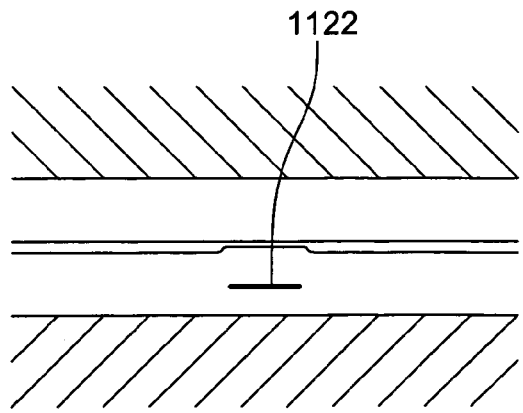

Depending on the physical and/or mechanical constraints and/or requirements imposed on the waveguide, the cladding 320 may extend laterally away from the core 310 so as to reduce or substantially eliminate any effect of a lateral waveguide cladding edge on an optical mode supported by core 310 (as in FIGS. 1B and 1E). Alternatively, cladding 320 may be formed so as to yield a protruding lateral surface on one or both sides of core 310 (as in FIGS. 1A, 1C, and 1D), and such surface(s) may or may not influence the characteristics of a supported optical mode. Such lateral cladding surfaces may be provided at varying depths, and may or may not extend downward near or beyond the depth of core 310. A waveguide may be formed to include multiple segments having various of these configurations.

Additional exemplary embodiments of a planar waveguide including a low-profile core are shown in cross-section in FIGS. 2A–2E positioned on a waveguide substrate 402. Substrate 402 may comprise a semiconductor substrate such as silicon (as in the preceding examples), or any suitable substrate material may be employed, including those listed hereinbelow and equivalents thereof. In these examples the waveguide may include a doped silica core 410 within lower-index cladding 420, which may comprise doped or undoped silica. The index contrast is typically much smaller than in the examples of FIGS. 1A–1E, and may be less than about 1 or 2%, for example (low-index-contrast, defined herein as core/cladding index contrast less than about 5%). The core may be about 0.5 μm high by about 5 μm wide in this example, yielding a transverse mode size of around 4–5 μm high by around 4–5 μm wide (mode sizes expressed as $1/e^2$ HW intensity). Such a mode might be well-suited for spatial-mode-matching with an optical fiber mode. A low-profile, low-index-contrast waveguide core may range from about 0.3 μm high up to about 2–3 μm high, and between about 1 μm and about 10 μm wide. Specific combinations of dimensions will depend on the desired spatial mode characteristics and the particular degree of index contrast employed. In addition to doped and undoped silica, other suitable low-index-contrast combinations of core and cladding materials may be equivalently employed, including those listed hereinbelow and equivalents thereof.

As in the previous examples, cladding 420 below core 410 may be sufficiently thick so as to reduce or substantially eliminate optical leakage from waveguide 400 into substrate 402 (within operationally acceptable limits), alone or in combination with a buffer layer provided on the substrate. Upper cladding may be sufficiently thick along portions of the waveguide so as to substantially prevent optical leakage through the upper surface of the waveguide, and/or may be sufficiently thin along other portions of the length of the waveguide so as to facilitate optical transverse-coupling between waveguides. Lateral portions of cladding 420 may be configured in any of the various ways described hereinabove, and waveguide 400 may be formed to include multiple segments having various of these configurations.

Figure 5A:
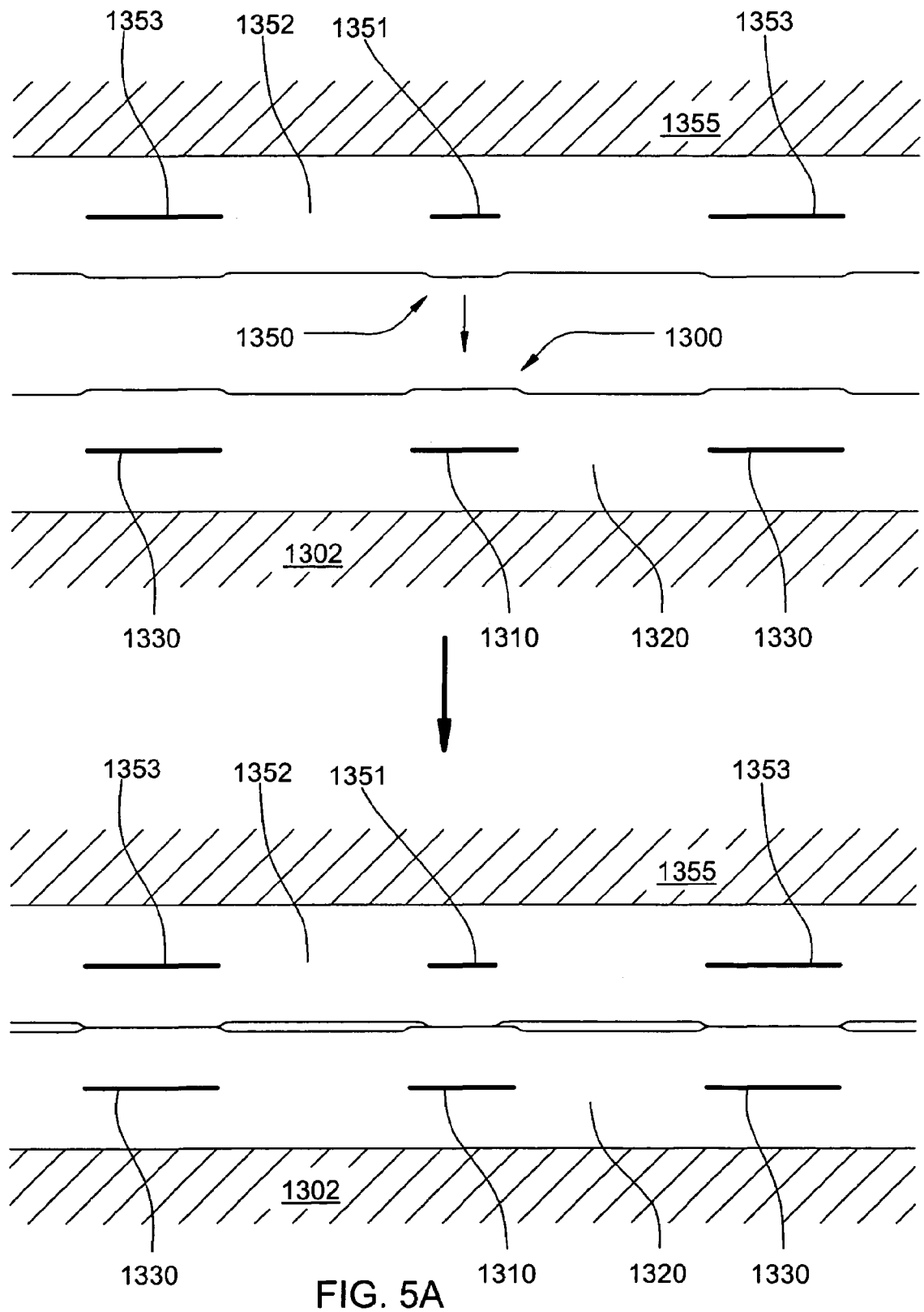
FIGS. 5A–5D are cross-sectional and plan views of assembled low-profile-core optical waveguides.
Figure 5B:
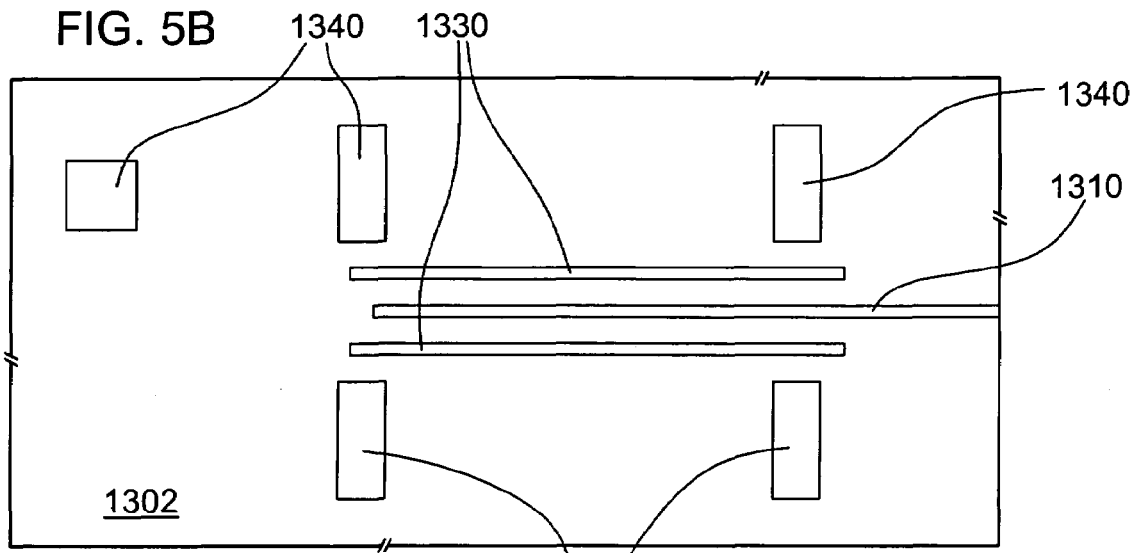
Figure 5C:
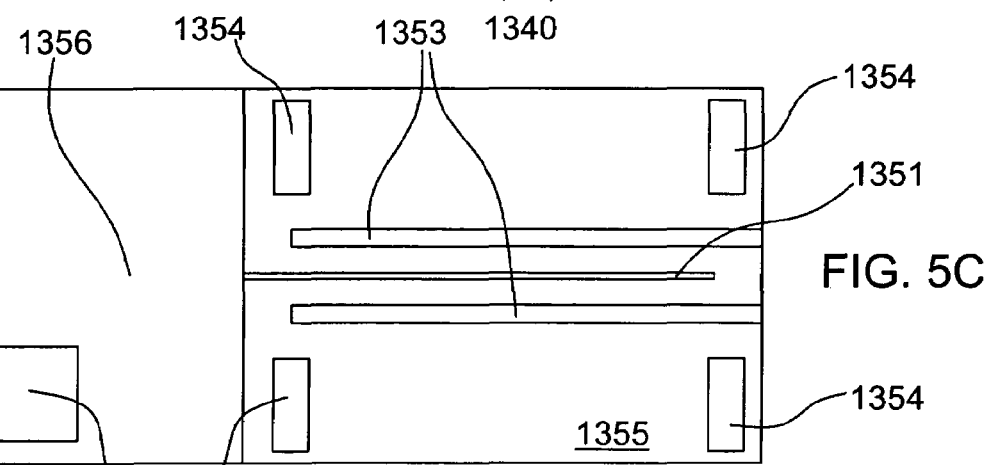
Figure 5D:
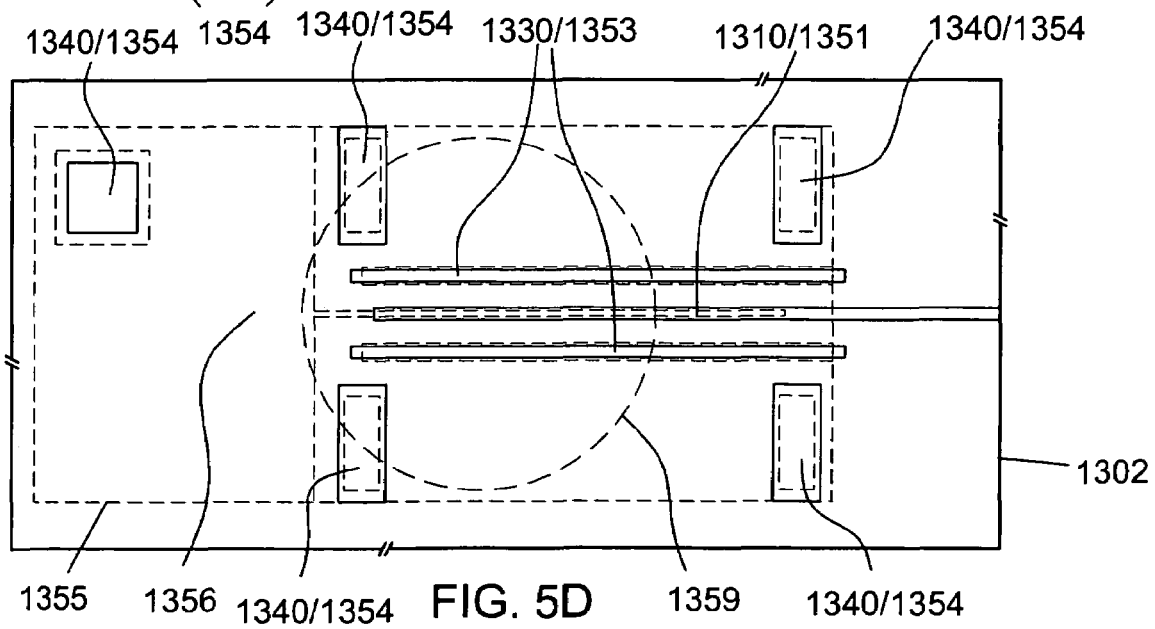

The structural properties of the layers and spatially selective material processing steps used to form a waveguide with a low-profile core may be further exploited for forming nearby structural members for alignment and/or support of optical waveguides assembled for transverse-coupling. In FIGS. 5A, 5B, and 5D, a pair of elongated areas 1330 of core material are shown on either side of core 1310, all patterned from a common layer of core material deposited on a lower layer of cladding 1320 on substrate 1302. Additional areas 1340 may be similarly patterned from the core material layer. Since core 1310 and structural areas 1330 and 1340 are formed concurrently from the same core material layer, their respective upper surfaces are substantially coplanar. Deposition of additional cladding 1320 yields substantially flat areas of the upper cladding surface of waveguide 1300 (above core 1310, forming a waveguide upper cladding surface) and above areas 1330 and 1340 (forming structural upper cladding surfaces). These respective upper cladding surfaces are substantially coplanar, and thus yield an enlarged mechanical mating surface for another similarly adapted waveguide 1350 (including core 1351, cladding 1352, and structural areas 1353 and 1354 on substrate 1355 along with optical device 1356; shown in FIGS. 5A, 5C, and 5D) assembled therewith for optical transverse-coupling. The enlarged contact surface area between the assembled waveguides reduces the likelihood of mechanical damage to the waveguides during positioning, alignment, and bonding (compression, thermal, soldering, or otherwise) and provides more stable and reproducible positioning relative to assembled waveguides lacking such enlarged areas of mechanical contact. Patterning of the structural members 1330/1340 from the same layer as the waveguide core 1310 (and subsequent concurrent deposition of cladding material 1320 over all) results in structural surfaces that are well aligned with respect to the relevant optical surfaces. Similarly, patterning of structural members 1353/1354 from the same layer as the waveguide core 1351 (and subsequent concurrent deposition of cladding 1352 over all) similarly results in structural surfaces that are well aligned with respect to the relevant optical surfaces.

The outlying structural areas 1340/1354 may be disposed about the waveguide cores 1310/1351, respectively, so as to provide additional alignment and/or support for the assembled substrates and to facilitate manipulation and placement of substrate 1355 on substrate 1302 (for assembling together the waveguides for transverse-coupling). FIG. 5D shows an outline of substrate 1355 (along with corresponding waveguide core 1351 and alignment/support structural members 1353/1354) positioned over substrate 1302. An outline or "footprint" 1359 for a device used to handle substrate 1355 is also shown. If the outlying alignment/support structural members 1340/1354 are positioned sufficiently far apart, non-parallelism of substrates 1302 and 1352 will not cause further tilting of the substrates relative to one another (and possible separation of the substrates at one edge), but will rather result in the substrates being forced together into a substantially parallel arrangement with the respective structural upper cladding surfaces positioned against one another. The substrates 1302 and 1355 may be further provided with metal solder contact areas and/or solder pads (not shown). These may be arranged so as to make first contact as the substrates are brought together for assembly. Heating the solder to its reflow temperature enables the substrates to further settle toward one another, until the respective structural upper cladding surfaces make contact. The solder is then allowed to cool and solidify with the substrates held in this fully engaged position.

Exemplary dimensions and positions that might be employed for forming waveguide core 1310 and alignment/support structural members 1330 may be about 6 μm wide for core 1310 and structural members 1330 (formed from a silicon nitride layer about 50–100 nm thick in this example), with about a 9 μm separation between the core and the adjacent structural members. Corresponding exemplary dimensions for structures on substrate 1355 may be about 2 μm for waveguide core 1351 and about 10 μm wide for alignment/support structural members 1353 (formed from a silicon nitride layer about 50–100 nm thick in this example), with about a 9 μm gap between the waveguide core and adjacent structural members. The greater width of waveguide core 1310 relative to waveguide core 1351 yields a broader range of lateral positions over which an operationally acceptable level of optical transverse-coupling may be achieved, while the greater widths of structural members 1353 relative to structural members 1330 yields a correspondingly larger range of lateral positions over which adequate mechanical engagement is maintained. In particular, there may be instances wherein operationally acceptable optical transverse-coupling might be achieved with negligible (or only oblique) mechanical contact between waveguide upper cladding surfaces. In such instances, contact between the structural upper cladding surfaces provides the needed mechanical alignment and support, despite a substantial lack thereof near the waveguide cores. Many suitable sets of number, shapes, positions, and/or dimensions for various alignment and/or support structural members may be employed (in addition to exemplary configurations set forth herein), depending on the optical and/or mechanical characteristics desired for the assembled transverse-coupled waveguides.

The structural members 1330 should be far enough from core 1310 to substantially avoid (within operationally acceptable limits) optical transverse-coupling therewith, and to similarly substantially avoid optical transverse-coupling with waveguide core 1351 upon assembly (over a range of relative waveguide positions within the assembly tolerance). Analogously, structural members 1353 should be far enough from core 1351 to substantially avoid (within operationally acceptable limits) optical coupling therewith, and to similarly substantially avoid optical coupling with waveguide core 1310 upon assembly (over a range of relative waveguide positions within the assembly tolerance). Separation between a waveguide core and an adjacent elongated structural member greater than about the width of the waveguide core may prove sufficient in may circumstances.

Figure 6:
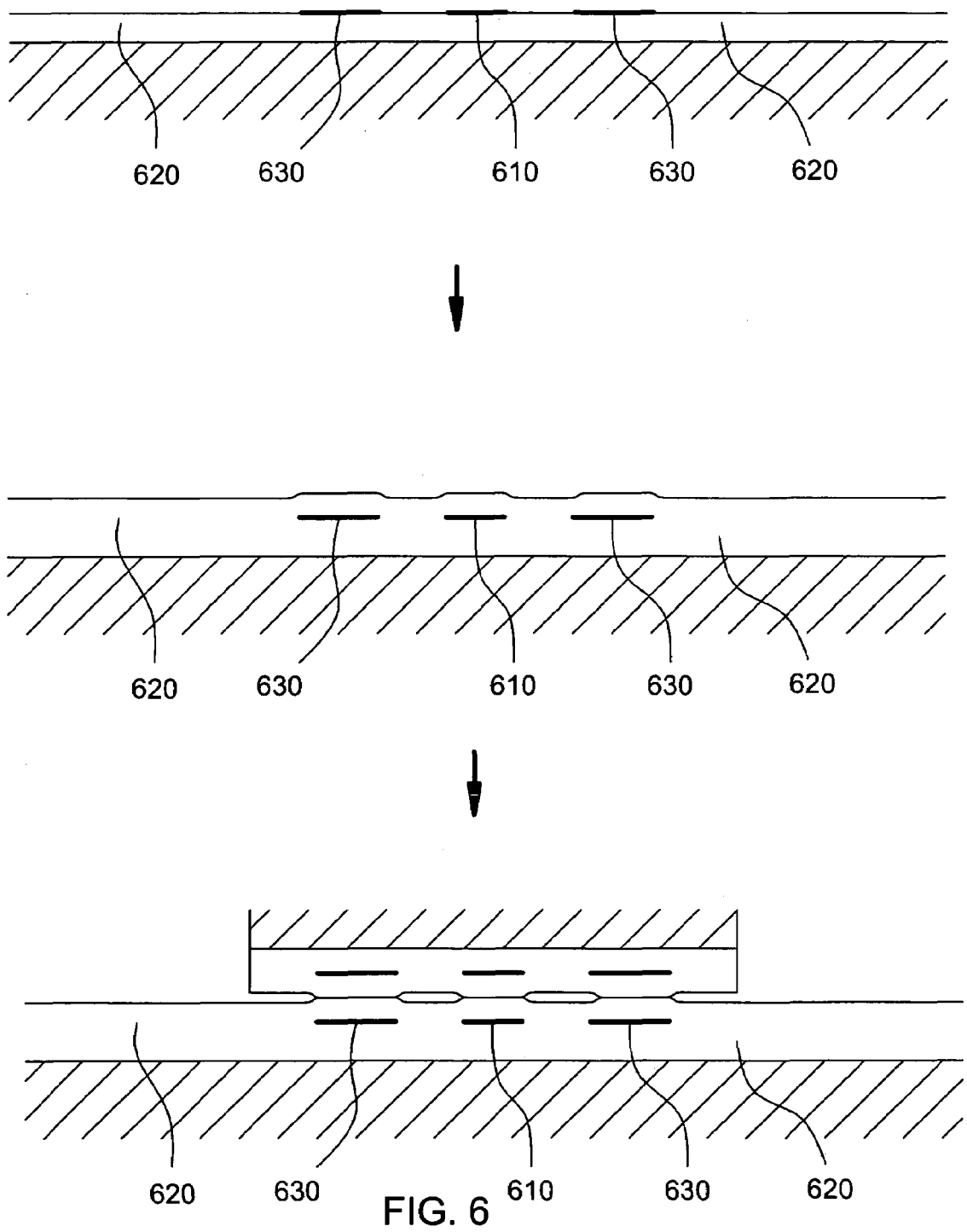
FIGS. 6–11 illustrate exemplary procedures for forming waveguide and structural upper cladding surfaces.
Figure 7:
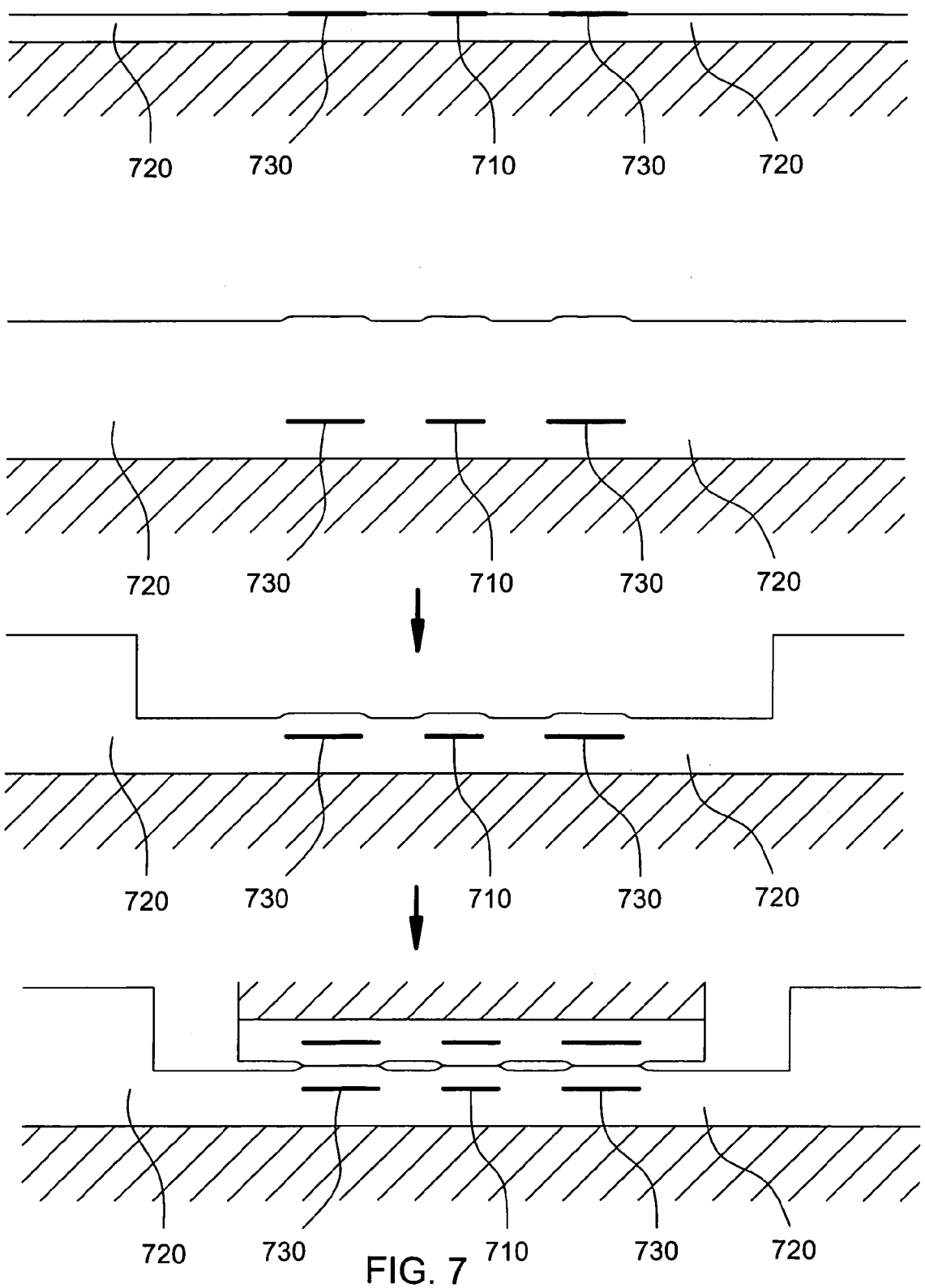

Various material processing sequences and/or techniques may be employed for forming substantially flat waveguide and structural upper cladding surfaces. In a first exemplary procedure (FIG. 6), cladding material 620 may be deposited over a portion of the substrate and lower cladding that includes at least a portion of core area 610 and structural member areas 630 of the core material layer. Cladding material 620 is deposited to the thickness desired for cladding material above the area(s) of core material, once the core material layer is deposited and the desired areas 610 and 630 have been patterned. The resulting waveguide and structural upper cladding surfaces are substantially coplanar, and assembly of two such waveguides results in both waveguide and structural upper cladding surfaces being positioned against one another. Another exemplary procedure (FIG. 7) may be employed if thicker areas of cladding material are desired elsewhere on the substrate. A thicker cladding layer 720 may be deposited over the substrate, followed by spatially-selective etching of the area encompassing the structural areas 730 and at least a portion of the core area 710 of the patterned core material layer. Both the deposition and etch processes tend to preserve the surface topography of the patterned areas of core material. The final thickness of cladding above the patterned core material (and therefore the height of the waveguide and structural upper cladding surfaces) is determined in part by timing the etch process, which may or may not be sufficiently precise depending on the relevant operationally acceptable parameters.

Figure 8:
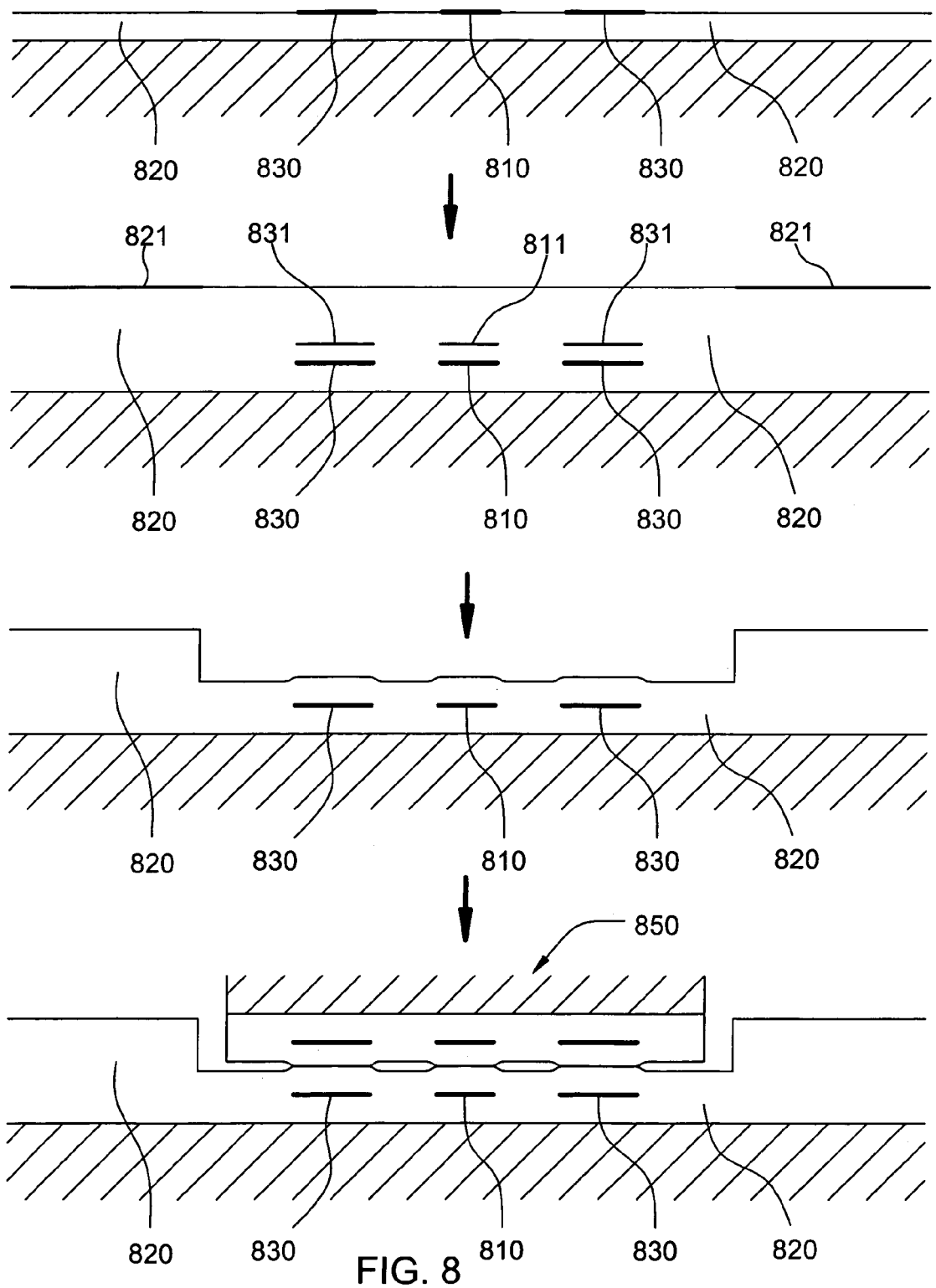

Another exemplary procedure may be employed (FIG. 8) in which upper cladding material 820 is first deposited to the thickness desired for the waveguide and structural upper cladding. A first etch-stop layer of any suitable type is deposited and patterned so as to cover the structural core material areas 830 (etch-stop areas 831) and at least a portion of the waveguide core area 810 (etch-stop area 811). Additional cladding material 820 is then deposited over the substrate to the thickness desired for other areas of the substrate, covering the etch-stop areas 811 and 831. A second etch-stop layer 821 of any suitable type is deposited and patterned so as to expose the cladding above the etch-stop layer areas 811 and 831, but protecting areas where thicker cladding is desired. The entire substrate is then subjected to a suitable etch process, which stops at the respective etch-stop layers. After removal of the (now exposed) etch-stop layers, the desired waveguide and structural upper cladding surfaces are ready for assembly with another waveguide 850 for transverse-coupling. The structures produced by the procedures of FIGS. 7 and 8 produce similar waveguides and structural members, but the procedure of FIG. 8 may offer greater precision for achieving a desired upper cladding thickness for the waveguide core and structural members.

Each of the foregoing exemplary processes yields substantially coplanar waveguide and structural upper cladding surfaces, so that upon assembly for transverse-coupling both waveguide and structural member upper cladding surfaces are positioned against their counterparts on the other similarly adapted waveguide substrate. This may typically be a suitable arrangement. There may be instances, however, where it is desirable to assemble waveguides for transverse-transfer of optical power therebetween while leaving a gap between the facing waveguide upper cladding surfaces (typically on the order of one or a few tenths of a micron). The procedures of FIGS. 7 and 8 may each be adapted to yield substantially parallel waveguide and structural upper cladding surfaces that differ in height above the substrate. In an exemplary adaptation of the procedure of FIG. 7, an additional etch step may be performed restricted to an area above core 710, thereby producing a waveguide upper cladding surface lower than the structural upper cladding surfaces. The height difference may be determined through control of etch parameters employed. Similarly, FIG. 8 may be adapted by employing an additional etch step restricted to an area above core 810 (after selective removal of etch-stop layer 811, for example).

Figure 9:
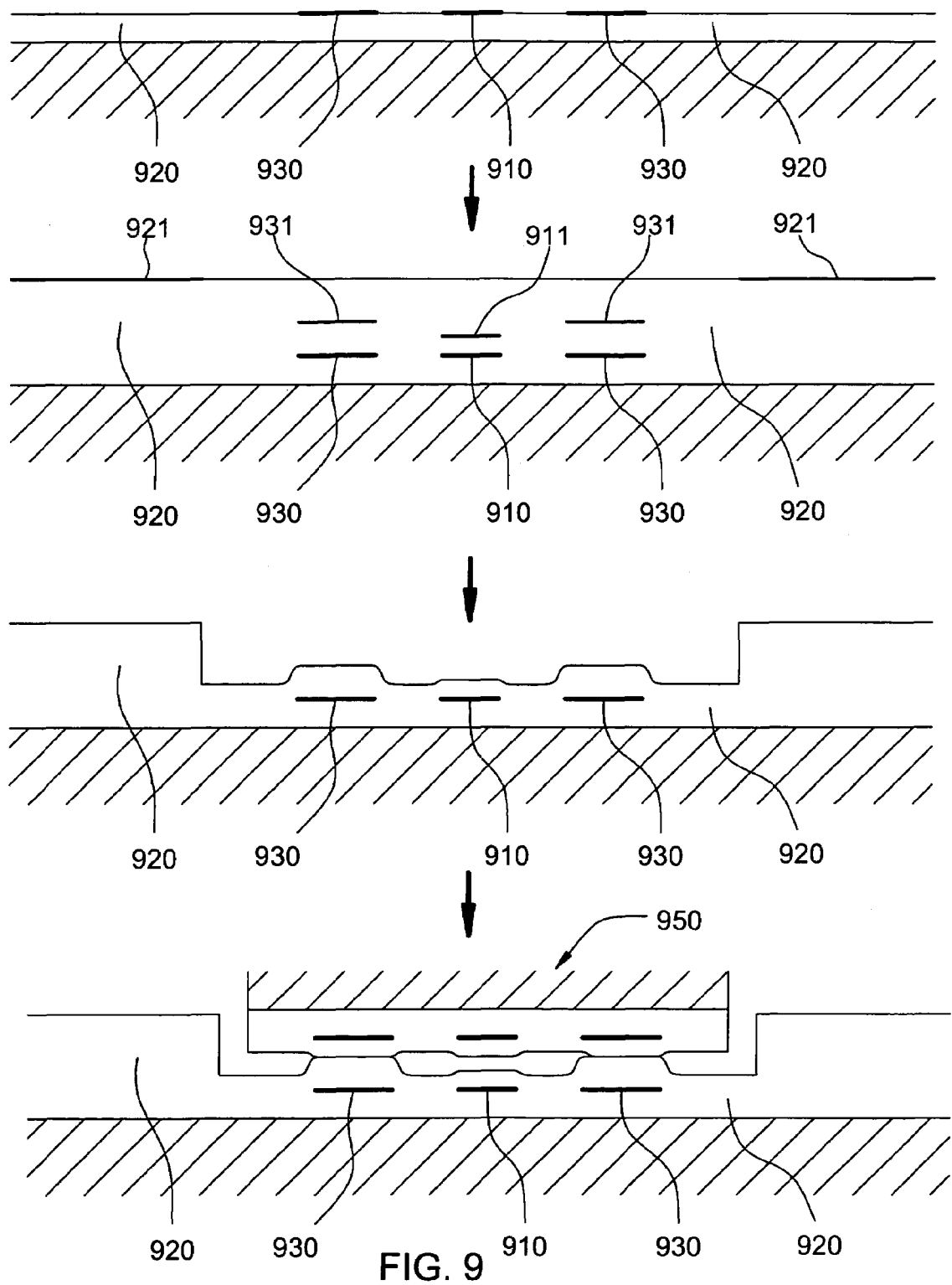

In the procedure of FIG. 9, after patterning of the core material layer to form the core area 910 and structural areas 930, cladding material 920 is deposited over the substrate to the thickness desired for the waveguide upper cladding. A suitable etch-stop layer 911 is deposited and patterned to cover a portion of the core area 910 only. Additional cladding 920 is then deposited over the substrate (covering the first etch-stop layer 911) to the thickness desired for the structural member upper cladding. A second etch-stop layer 931 is deposited and patterned to cover only the structural member areas 930. Additional cladding 920 is then deposited over the substrate (covering the second etch-stop layer 931) to the thickness desired for the remainder of the substrate, and a third etch-stop layer 921 is deposited covering those areas where thicker cladding is desired (but leaving exposed the desired areas of cladding above the first and second etch-stop layers). The entire substrate is then subjected to a suitable etch process, which stops at the etch-stop layers over each respective area. After removal of the etch-stop layers, the desired waveguide and structural upper cladding surfaces are ready for assembly with another waveguide 950 for transverse-coupling. The structural upper cladding surfaces (above areas 930), being higher than the waveguide upper cladding surface, may be positioned against their counterpart areas on another waveguide substrate while leaving a gap between the facing waveguide upper cladding surfaces of the assembled transverse-coupled waveguides.

It should be noted that the foregoing procedures are exemplary. Many other material processing sequences or procedures may be contrived to produce waveguide and structural upper cladding surfaces while remaining within the scope of the present disclosure and/or appended claims.

Figure 10A:
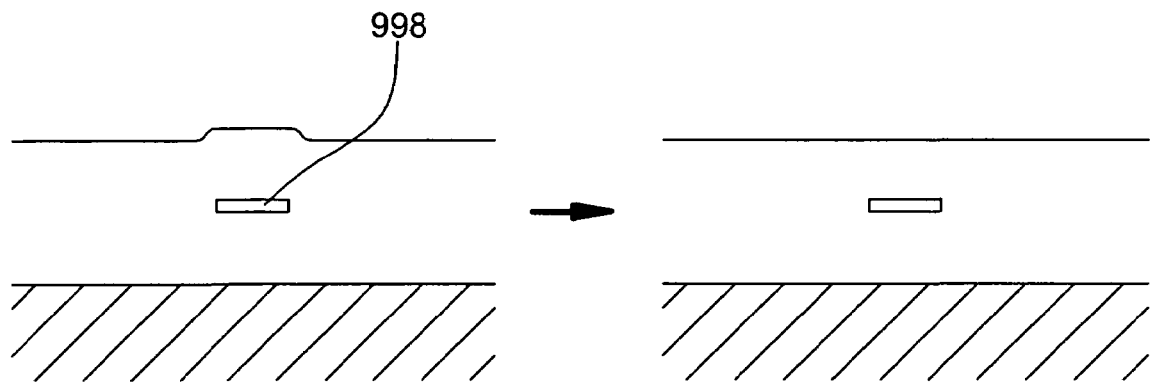
Figure 10B:
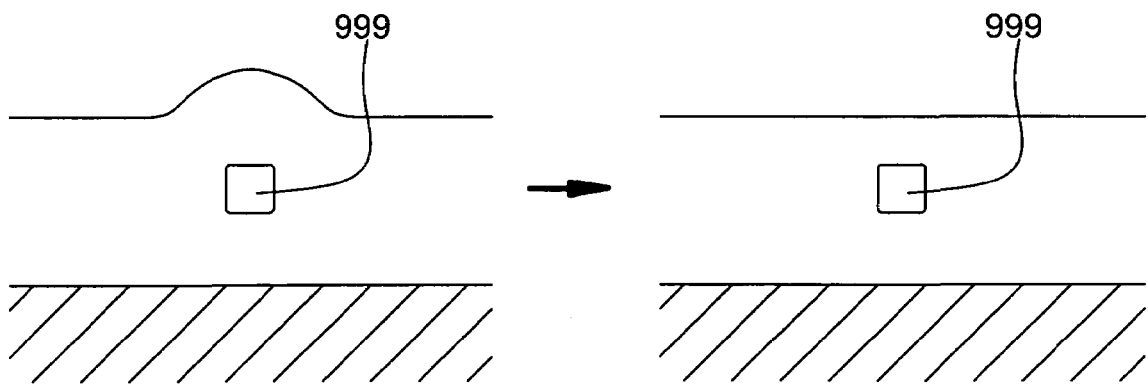
Figure 11:
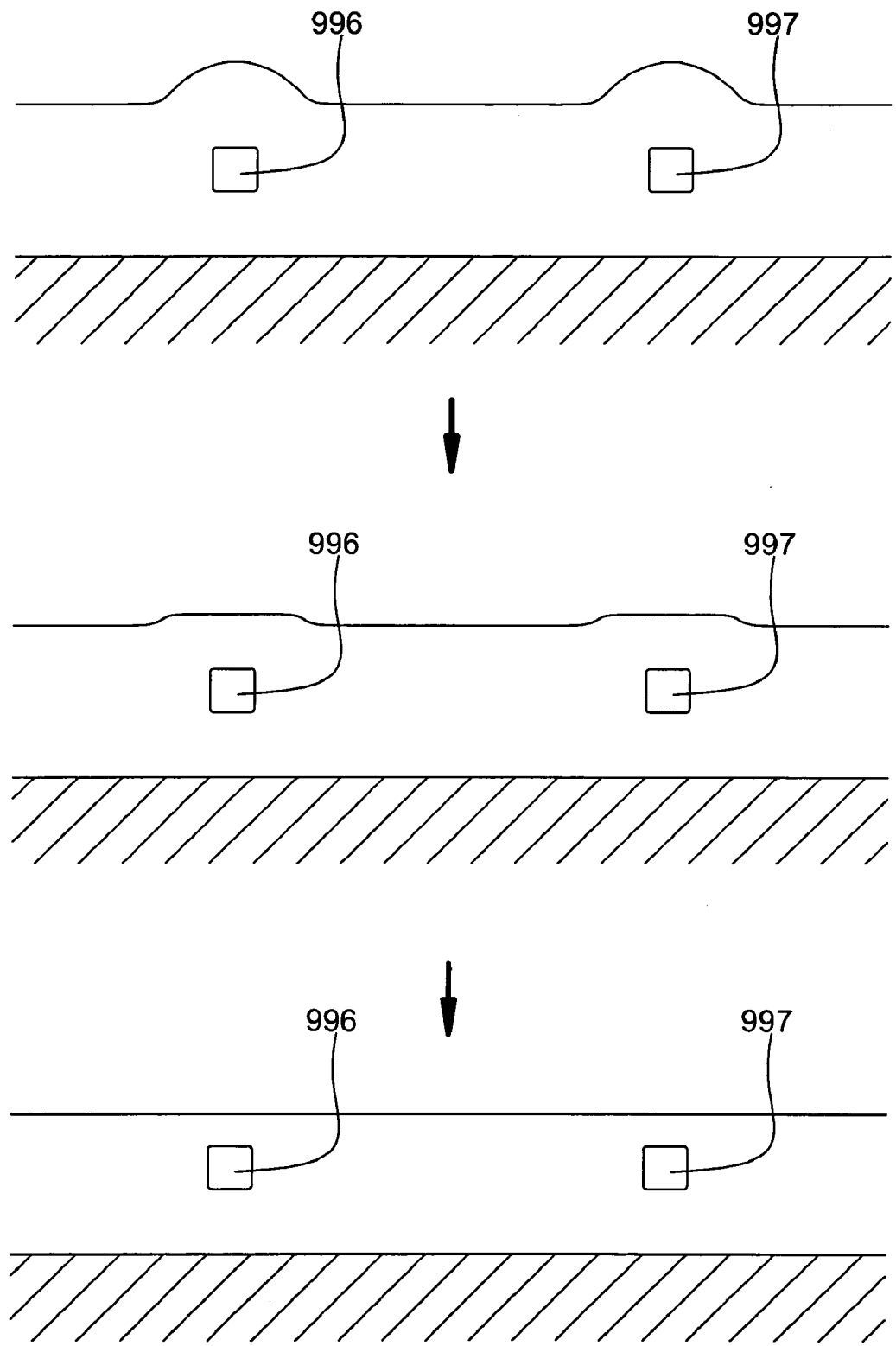

Each of the foregoing exemplary processes depends at one or more stages on substantially flat cladding material surfaces being formed by deposition over a low-profile waveguide core. In contrast, chemical-mechanical polishing (CMP) and/or equivalent processing technique(s) may be employed to produce substantially flat waveguide and structural upper cladding surfaces, regardless of the topography of the underlying core material. While deposition of cladding material over a low-profile core may typically result in waveguide structures resembling FIGS. 1B and 2B, for example, CMP may be employed to produce the waveguide structures resembling FIGS. 1E and 2E, for example. CMP and/or equivalent processes may be employed to produce substantially flat substantially coplanar waveguide and structural upper cladding surfaces, for a low-profile core area 998 (FIG. 10A) as well as for a core area 999 having a height comparable to or even greater than its thickness (FIG. 10B). CMP may be employed to yield separate waveguide and structural member surfaces similar to those described hereinabove over structural area 996 and core area 997 of a patterned core material layer (middle step of FIG. 11), or may be carried further to yield a single substantially contiguous substantially flat surface over both waveguide core and structural areas (last step of FIG. 11). Such a single flat surface may be assembled with another similarly configured waveguide substrate, or may be assembled with a substrate having separate waveguide and structural upper cladding areas (such as waveguide 1350 of FIG. 5A, for example).

Figure 12A:
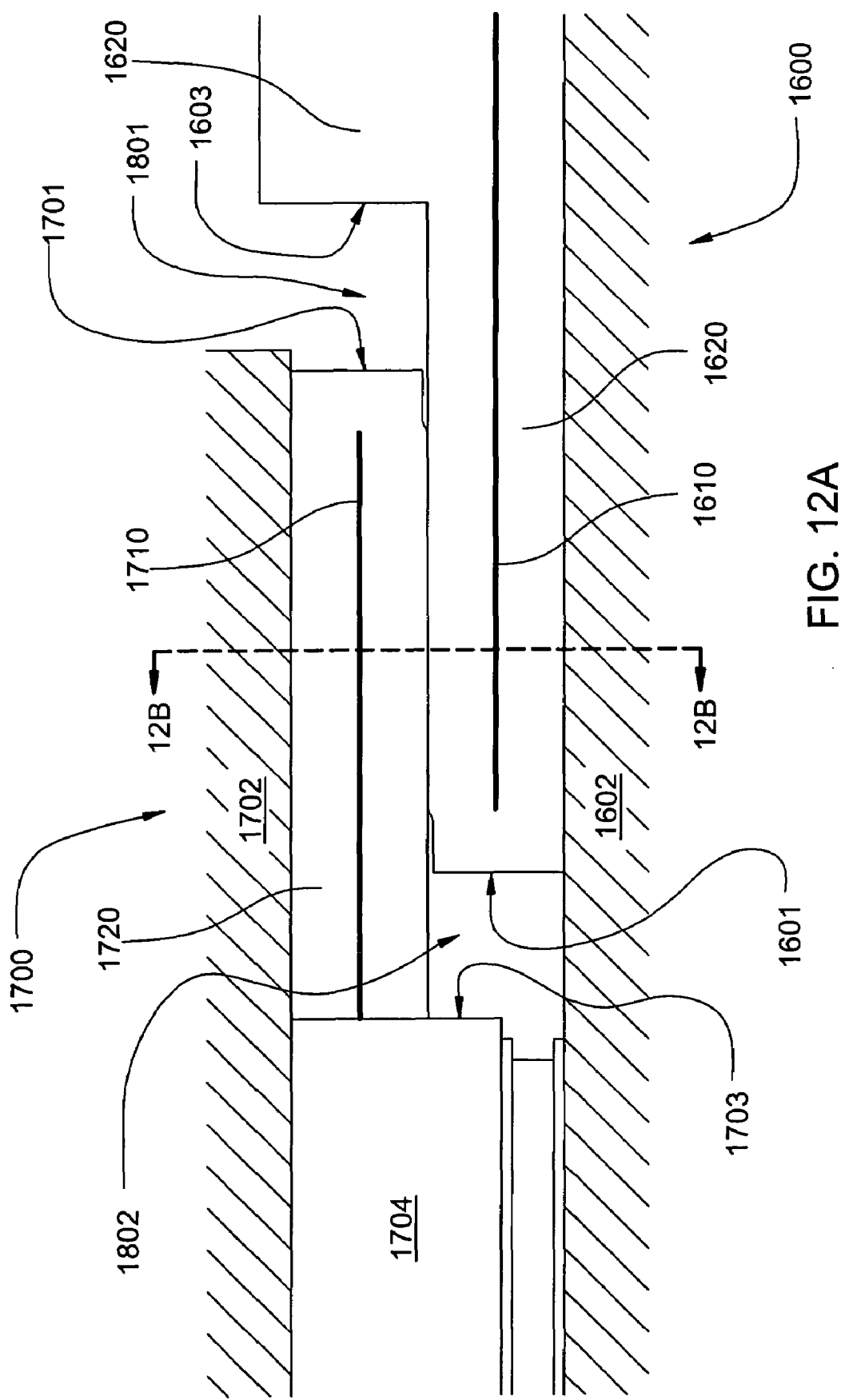
FIGS. 12A–12B are longitudinal and transverse cross-sectional views of assembled and embedded low-profile-core optical waveguides.
Figure 12B:
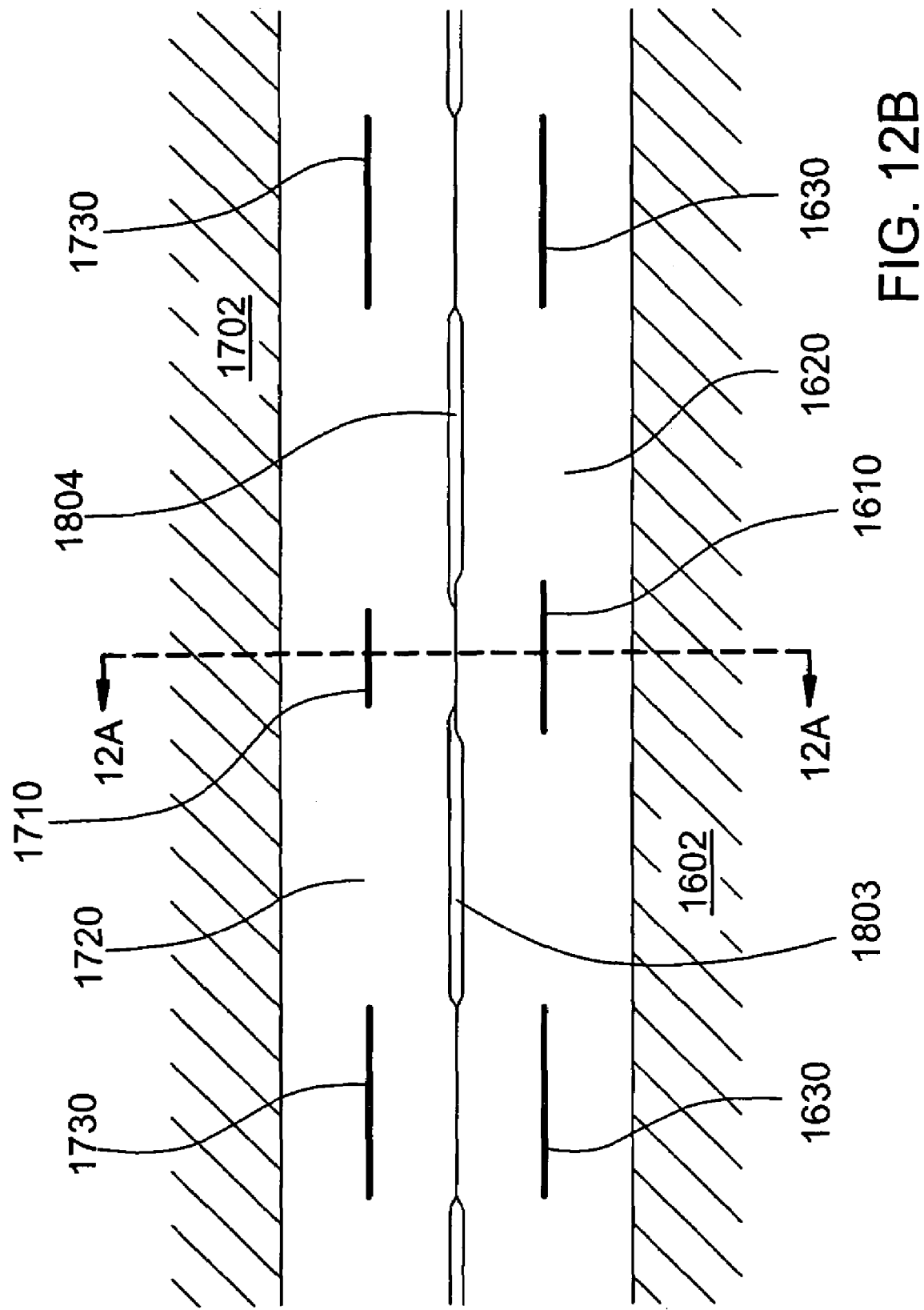

Transparent embedding media are frequently employed for securing assembled optical components together and to provide a mechanical/moisture/chemical barrier for isolating critical optical surfaces from contamination or damage. Such embedding media may fulfill the function of more traditional hermetic packaging, and may frequently take the form of polymer precursors that are applied to an optical assembly in liquid form, allowed to flow into and fill the desired volumes in and around the optical assembly, and then cured to form a substantially solid embedding medium surrounding the assembled optical components. Such embedding may also serve to reduce the index contrast between various components of the optical assembly and the surrounding environment. Reduced index contrast may serve to: reduce unwanted reflections at transmissive component surfaces; reduce optical scattering and/or unwanted optical coupling due to imperfect or irregular component surfaces; reduce diffractive losses for an optical waveguide end-coupled with another optical waveguide, component, or device; loosen translational and/or angular alignment tolerances for transverse-coupled or end-coupled optical components; and/or reduce optical losses and/or unwanted optical coupling due to mechanical juxtaposition of transverse-coupled optical components. An exemplary optical assembly is shown in FIGS. 12A–12B including transverse-coupled optical waveguides 1600 (including core 1610, cladding 1620, and support members 1630 on substrate 1602) and 1700 (including core 1710, cladding 1720, and support members 1730 on substrate 1702; waveguide 1700 integrated and end-coupled with optical device 1704).

Waveguide 1700 terminates at end face 1701, while waveguide 1600 terminates at end face 1601. Along the waveguide segments where optical transverse-coupling occurs, cores 1610 and 1710 are each provided with relatively thin upper cladding (cladding 1620 and 1720, respectively; typically less than 1 µm thick). The thin upper cladding makes the respective cores accessible for transverse-coupling. Unacceptable levels of optical loss and/or undesirable optical mode coupling may be induced: i) in waveguide 1700 by device end face 1703; ii) in waveguide 1700 by the abrupt appearance of waveguide 1600 at end face 1601; iii) in waveguide 1600 by the abrupt appearance of waveguide 1700 at end face 1701; iv) in waveguide 1600 by the abrupt appearance of a thicker upper cladding layer at face 1603. Surface irregularities and/or contamination along the sides and/or exposed surfaces of waveguides 1600 and/or 1700 may also lead to unacceptable levels of optical loss and/or undesirable optical mode coupling. Filling spaces 1801, 1802, 1803, and 1804 with an embedding medium having an index near that of cladding 1620 and/or 1720 (or at least nearer than an index of unity) serves to reduce such optical losses and mode couplings. If the embedding material index substantially matches that of cladding 1620 and 1720, losses and mode coupling from these sources may be substantially eliminated.

To have the desired effect, an embedding medium must cover substantially uniformly the relevant optical surfaces. If the coverage is non-uniform, optical losses and/or undesirable optical mode couplings may not be sufficiently reduced, and may even be increased relative to a non-embedded optical assembly. Substantially uniformly filling volumes 1803 and 1804 may prove problematic, due to the elongated shape and relatively thin vertical extent (less than 0.5 µm for silicon nitride cores 1610 and 1710, for example). Surface tension and/or viscosity of the embedding precursor, as well as air trapped within these volumes, may not always result in uniform filling of volumes 1803/1804. Support structures 1630 and/or 1730 may be segmented (as in FIG. 13), leaving lateral channels 1805 between the support structure segments. These lateral channels provide multiple flow paths (indicated by arrows) for embedding precursor to substantially fill all of the required volumes 1803 and 1804, while also providing a path for air to escape as the embedding material flows in. Flow channels of differing depths may be employed for controlling the flow of embedding material. For example, a deeper longitudinal channel 1806 may provide rapid flow, so that slower flow through lateral channels 1805 flows in the same direction for all such channels. Such unidirectional flow may result in more uniform filling of volumes 1803/1804. Support structures on both of the assembled waveguide substrates may be segmented in this way, or on only one or the other of the assembled waveguide substrates. It may be desirable to provide additional structures (not shown) similar to support structures 1630/1730 on one or both of substrates 1602 and 1702 near the respective waveguides, not necessarily to provide additional mechanical support, but to further guide the flow of embedding precursor on the optical assembly (directing flow in some instances, diverting or preventing flow in other instances).

Figure 14:
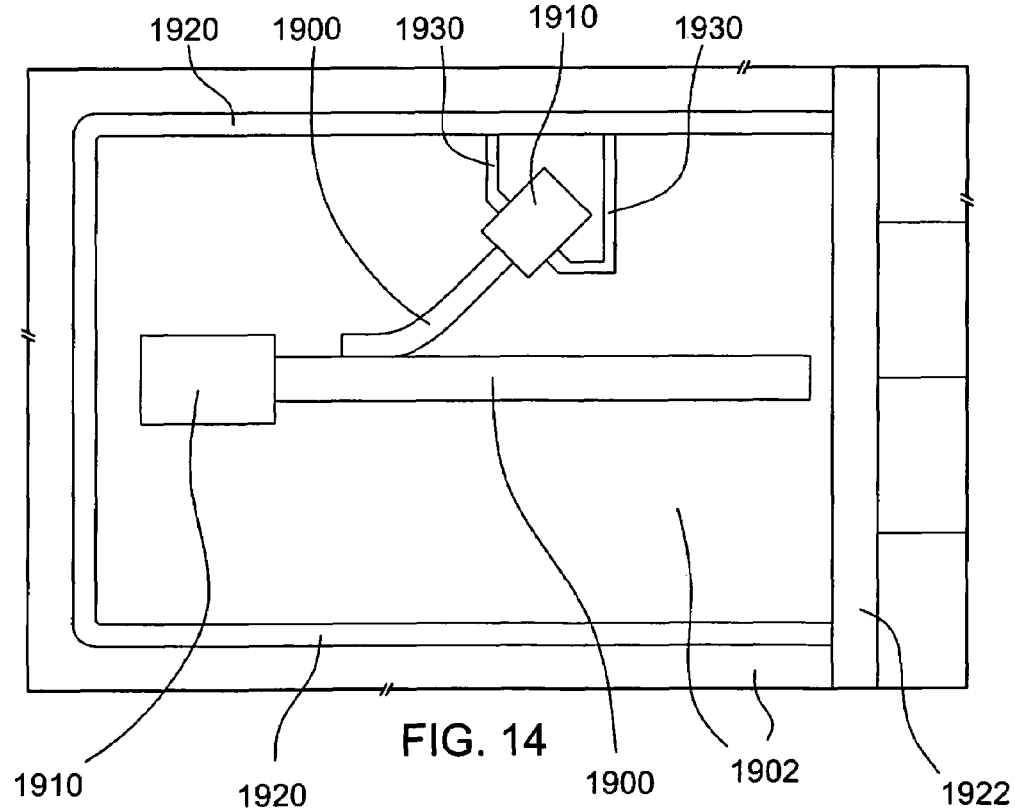
FIG. 14 is a plan view of optical devices assembled onto a waveguide substrate.

Additional structures may be employed elsewhere on a waveguide substrate for guiding the flow of embedding material precursor prior to curing. FIG. 14 shows a waveguide substrate 1902 with waveguides 1900 and optical devices 1910 assembled onto substrate 1902. Concealed beneath devices 1910 are optical transverse-coupled waveguides and support structures as shown in FIGS.

Figure 13:
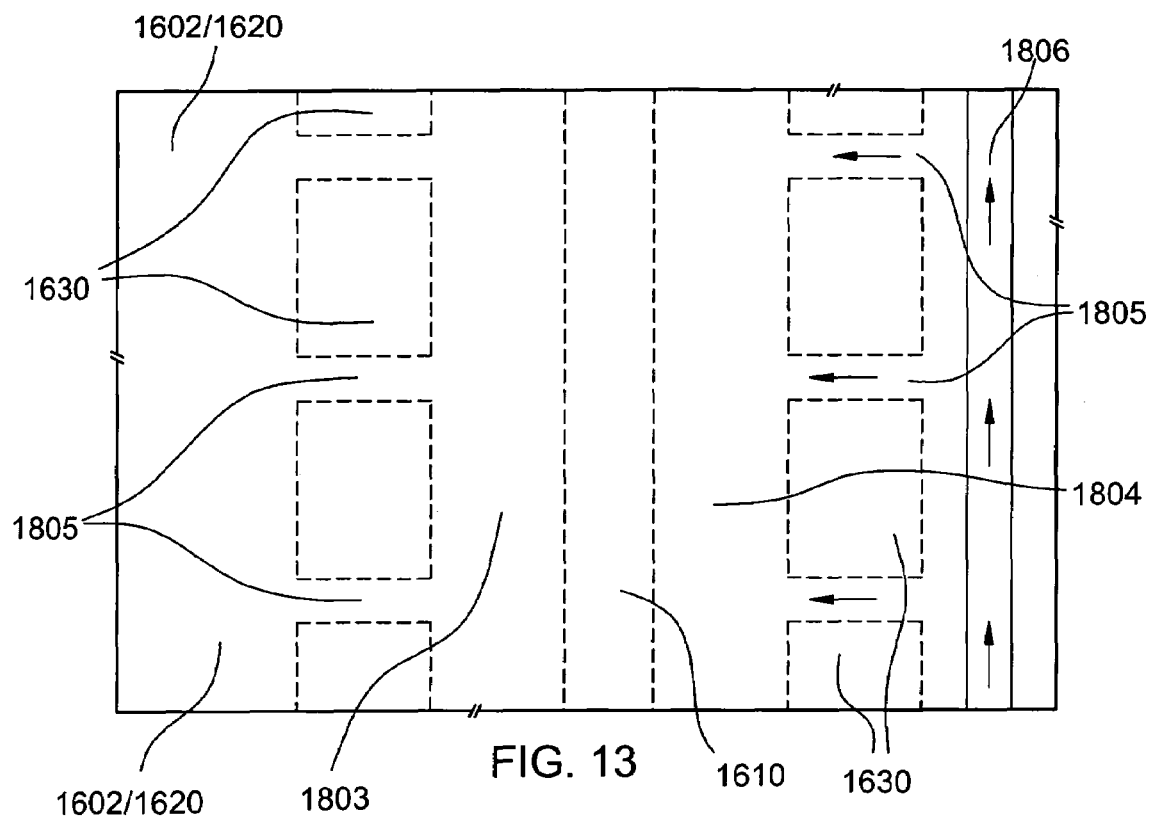
FIG. 13 is a plan view of a low-profile-core optical waveguide.

12A–12B and FIG. 13 (including segmented support structures for facilitating embedding precursor flow around the waveguides). Also shown is a gutter 1920 formed around the optical assembly, for limiting the extent of the flow of the embedding precursor. Excess precursor would flow into the gutter, either to remain there or to flow off of the substrate wafer, through saw cut 1922 in this example. Structures 1930, similar in form to support structures 1630/1640 of FIGS. 12A–12B and FIG. 13, are shown limiting precursor flow near one of devices 1910. Such gutters and barriers may be configured in a variety of ways for meeting particular structural requirements for the location of embedding material, while remaining within the scope of the present disclosure and/or appended claims.

It should be noted that such embedding flow control structures, as with other structures formed on substrate 1902, may be formed using spatially selective material processing on a wafer scale concurrently for many substrates 1902. Assembly of components 1910 onto substrate 1902 may be performed on a wafer scale for multiple substrates 1902 prior to division of the wafer, or such assembly may be performed after division of the wafer (either at the "bar" level for multiple substrates 1902 in single rows divided from the wafer, or at the individual substrate level). If assembly is performed prior to division of the wafer or at the bar level, then application of embedding precursor to substrate 1902 and assembled components 1902 may also be performed prior to division of the substrate wafer or at the bar level, respectively.

A variety of optical waveguides, optical devices, and/or optical components may be secured and embedded on a planar waveguide substrate as described hereinabove. Embedded optical components and/or waveguides may be transverse-coupled, end-coupled, or otherwise arranged for achieving the desired optical functionality. Embedding of such components and/or waveguides shall fall within the scope of the present disclosure and/or appended claims.

There are many suitable materials that may be employed for embedding optical waveguides and other optical components and/or devices on a planar waveguide substrate. Silicone and silicone-based polymer of various sorts have been successfully employed for such embedding. Other suitable materials may include but are not limited to polyimides, epoxies, CYTOP (Asahi Glass Company; a polyfluorinated polymeric material that may be cross-linked), silicone and silicone-based polymers, siloxane polymers, Cyclotene™ (B-staged bis-benzocyclobutene, Dow), Teflon® AF (DuPont), or other polymers. Various of these materials may have significantly temperature-dependent refractive indices. If such materials are employed, this temperature dependency must be compensated in some instances, may be exploited in other instances for active device control, or may be safely ignored in still other instances.

For purposes of the foregoing written description and/or the appended claims, "index" may denote the bulk refractive index of a particular material (also referred to herein as a "material index") or may denote an "effective index" $n_{eff}$, related to the propagation constant $\beta$ of a particular optical mode in a particular optical element by $\beta = 2\pi n_{eff}/\lambda$. The effective index may also be referred to herein as a "modal index". As referred to herein, the term "low-index" shall denote any materials and/or optical structures having an index less than about 2.5, while "high-index" shall denote any materials and/or structures having an index greater than about 2.5. Within these bounds, "low-index" may refer to: silica ($SiO_x$), germano-silicate, boro-silicate, other doped silicas, and/or other silica-based materials; silicon nitride ($Si_xN_y$) and/or silicon oxynitrides ($SiO_xN_y$); other glasses; other oxides; various polymers; and/or any other suitable optical materials having indices below about 2.5. "Low-index" may also include optical fiber, optical waveguides, planar optical waveguides, and/or any other optical components incorporating such materials and/or exhibiting a modal index below about 2.5. Similarly, "high-index" may refer to materials such as semiconductors, IR materials, and/or any other suitable optical materials having indices greater than about 2.5, and/or optical waveguides of any suitable type incorporating such material and/or exhibiting a modal index greater than about 2.5. The terms "low-index" and "high-index" are to be distinguished from the terms "lower-index" and "higher-index", also employed herein. "Low-index" and "high-index" refer to an absolute numerical value of the index (greater than or less than about 2.5), while "lower-index" and "higher-index" are relative terms indicating which of two particular materials has the larger index, regardless of the absolute numerical values of the indices.

For purposes of the foregoing written description and/or the appended claims, the term "optical waveguide" (or equivalently, "waveguide") as employed herein shall denote a structure adapted for supporting one or more optical modes. Such waveguides shall typically provide confinement of a supported optical mode in two transverse dimensions while allowing propagation along a longitudinal dimension. The transverse and longitudinal dimensions/directions shall be defined locally for a curved waveguide; the absolute orientations of the transverse and longitudinal dimensions may therefore vary along the length of a curvilinear waveguide, for example. Examples of optical waveguides may include, without being limited to, various types of optical fiber and various types of planar waveguides. The term "planar optical waveguide" (or equivalently, "planar waveguide") as employed herein shall denote any optical waveguide that is provided on a substantially planar substrate. The longitudinal dimension (i.e., the propagation dimension) shall be considered substantially parallel to the substrate. A transverse dimension substantially parallel to the substrate may be referred to as a lateral or horizontal dimension, while a transverse dimension substantially perpendicular to the substrate may be referred to as a vertical dimension. Examples of such waveguides include ridge waveguides, buried waveguides, semiconductor waveguides, other high-index waveguides ("high-index" being above about 2.5), silica-based waveguides, polymer waveguides, other low-index waveguides ("low-index" being below about 2.5), core/clad type waveguides, multi-layer reflector (MLR) waveguides, metal-clad waveguides, air-guided waveguides, vacuum-guided waveguides, photonic crystal-based or photonic bandgap-based waveguides, waveguides incorporating electro-optic (EO) and/or electro-absorptive (EA) materials, waveguides incorporating non-linear-optical (NLO) materials, and myriad other examples not explicitly set forth herein which may nevertheless fall within the scope of the present disclosure and/or appended claims. Many suitable substrate materials may be employed, including semiconductor, crystalline, silica or silica-based, other glasses, ceramic, metal, and myriad other examples not explicitly set forth herein which may nevertheless fall within the scope of the present disclosure and/or appended claims.

One exemplary type of planar optical waveguide that may be suitable for use with optical components disclosed herein is a so-called PLC waveguide (Planar Lightwave Circuit). Such waveguides typically comprise silica or silica-based waveguides (often ridge or buried waveguides; other waveguide configuration may also be employed) supported on a substantially planar silicon substrate (typically with an interposed silica or silica-based optical buffer layer). Sets of one or more such waveguides may be referred to as planar waveguide circuits, optical integrated circuits, or opto-electronic integrated circuits. A PLC substrate with one or more PLC waveguides may be readily adapted for mounting one or more optical sources, lasers, modulators, and/or other optical devices adapted for end-transfer of optical power with a suitably adapted PLC waveguide. A PLC substrate with one or more PLC waveguides may be readily adapted (according to the teachings of earlier-cited U.S. application Ser. Nos. 60/334,705, 60/360,261, 10/187,030, and/or 60/466,799) for mounting one or more optical sources, lasers, modulators, and/or other optical devices adapted for transverse-transfer of optical power with a suitably adapted PLC waveguide (mode-interference-coupled, or substantially adiabatic, transverse-transfer; also referred to as transverse-coupling).

For purposes of the foregoing written description and/or appended claims, "spatially-selective material processing techniques" shall encompass epitaxy, layer growth, lithography, photolithography, evaporative deposition, sputtering, vapor deposition, chemical vapor deposition, beam deposition, beam-assisted deposition, ion beam deposition, ion-beam-assisted deposition, plasma-assisted deposition, wet etching, dry etching, ion etching (including reactive ion etching), ion milling, laser machining, spin deposition, spray-on deposition, electrochemical plating or deposition, electroless plating, photo-resists, UV curing and/or densification, micro-machining using precision saws and/or other mechanical cutting/shaping tools, selective metallization and/or solder deposition, chemical-mechanical polishing for planarizing, any other suitable spatially-selective material processing techniques, combinations thereof, and/or functional equivalents thereof. In particular, it should be noted that any step involving "spatially-selectively providing" a layer or structure may involve either or both of: spatially-selective deposition and/or growth, or substantially uniform deposition and/or growth (over a given area) followed by spatially-selective removal. Any spatially-selective deposition, removal, or other process may be a so-called direct-write process, or may be a masked process. It should be noted that any "layer" referred to herein may comprise a substantially homogeneous material layer, or may comprise an inhomogeneous set of one or more material sub-layers. Spatially-selective material processing techniques may be implemented on a wafer scale for simultaneous fabrication/processing of multiple structures on a common substrate wafer.

It should be noted that various components, elements, structures, and/or layers described herein as "secured to", "connected to", "deposited on", "formed on", or "positioned on" a substrate may make direct contact with the substrate material, or may make contact with one or more layer(s) and/or other intermediate structure(s) already present on the substrate, and may therefore be indirectly "secured to", etc, the substrate.

The phrase "operationally acceptable" appears herein describing levels of various performance parameters of optical components and/or optical devices, such as optical power transfer efficiency (equivalently, optical coupling efficiency), optical loss, undesirable optical mode coupling, and so on. An operationally acceptable level may be determined by any relevant set or subset of applicable constraints and/or requirements arising from the performance, fabrication, device yield, assembly, testing, availability, cost, supply, demand, and/or other factors surrounding the manufacture, deployment, and/or use of a particular optical device. Such "operationally acceptable" levels of such parameters may therefor vary within a given class of devices depending on such constraints and/or requirements. For example, a lower optical coupling efficiency may be an acceptable trade-off for achieving lower device fabrication costs in some instances, while higher optical coupling may be required in other instances in spite of higher fabrication costs. The "operationally acceptable" coupling efficiency therefore varies between the instances. In another example, higher optical loss (due to scattering, absorption, undesirable optical coupling, and so on) may be an acceptable trade-off for achieving lower device fabrication cost or smaller device size in some instances, while lower optical loss may be required in other instances in spite of higher fabrication costs and/or larger device size. The "operationally acceptable" level of optical loss therefore varies between the instances. Many other examples of such trade-offs may be imagined. Optical devices and fabrication methods therefor as disclosed herein, and equivalents thereof, may therefore be implemented within tolerances of varying precision depending on such "operationally acceptable" constraints and/or requirements. Phrases such as "substantially adiabatic", "substantially spatial-mode-matched", "substantially modal-index-matched", "so as to substantially avoid undesirable optical coupling", and so on as used herein shall be construed in light of this notion of "operationally acceptable" performance.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: i) it is explicitly stated otherwise, e.g., by use of "either . . . or", "only one of . . . ", or similar language; or ii) two or more of the listed alternatives are mutually exclusive within the particular context, in which case "or" would encompass only those combinations involving non-mutually-exclusive alternatives.

While particular examples have been disclosed herein employing specific materials and/or material combinations and having particular dimensions and configurations, it should be understood that many materials and/or material combinations may be employed in any of a variety of dimensions and/or configurations while remaining within the scope of inventive concepts disclosed and/or claimed herein.

It is intended that equivalents of the disclosed exemplary embodiments and methods shall fall within the scope of the present disclosure and/or appended claims. It is intended that the disclosed exemplary embodiments and methods, and equivalents thereof, may be modified while remaining within the scope of the present disclosure and/or appended claims.

What is claimed is:

1. A method for fabricating an optical apparatus, comprising:

forming a first planar optical waveguide comprising a first waveguide core within a first cladding, an upper surface of the first cladding over the first core being substantially flat along at least a portion of the length thereof and thereby forming a first substantially flat waveguide upper cladding surface;

forming at least one additional area of first core material within the first cladding, the additional area of first core material forming a corresponding substantially flat first structural upper cladding surface substantially parallel to the first substantially flat waveguide upper cladding surface;

forming a second planar optical waveguide comprising a second waveguide core within a second cladding, an upper surface of the second cladding over the second core being substantially flat along at least a portion of the length thereof and thereby forming a second substantially flat waveguide upper cladding surface;

forming at least one additional area of second core material within the second cladding, the additional area of second core material forming a corresponding substantially flat second structural upper cladding surface substantially parallel to the second substantially flat waveguide upper cladding surface; and assembling the first and second planar optical waveguides together with at least portions of their corresponding substantially flat structural upper cladding surfaces positioned against one another and with at least portions of their corresponding waveguide upper cladding surfaces facing one another, thereby positioning the first and second planar optical waveguides for optical transverse-coupling between the first and second cores along corresponding transverse-coupled portions thereof, wherein:

the additional area of first core material is positioned so as to substantially avoid optical coupling with the first waveguide core and, upon assembly of the first and second planar optical waveguides, to substantially avoid optical coupling with the second waveguide core; and the additional area of second core material is positioned so as to substantially avoid optical coupling with the second waveguide core and, upon assembly of the first and second planar optical waveguides, to substantially avoid optical coupling with the first waveguide core.

2. The method of claim 1, wherein the first and second planar optical waveguides are assembled together with their corresponding substantially flat waveguide upper cladding surfaces positioned against one another.

3. The method of claim 1, wherein the first and second planar optical waveguides are assembled together with their corresponding substantially flat waveguide upper cladding surfaces spaced-apart from one another.

4. The method of claim 1, wherein the first waveguide core or the second waveguide core has a lateral dimension thereof that is larger than a vertical dimension thereof along a portion of the waveguide core below the corresponding substantially flat waveguide upper cladding surface.

5. The method of claim 1, wherein the first waveguide upper cladding surface and the first structural upper cladding surface are non-coplanar, thereby positioning, upon assembly of the first and second planar optical waveguides, the first and second optical waveguides with their corresponding substantially flat upper waveguide cladding surfaces spaced-apart from one another.

6. The method of claim 1, wherein the first waveguide upper cladding surface and the first structural upper cladding surface are substantially coplanar.

7. The method of claim 1, wherein
the first waveguide upper cladding surface and the first structural upper cladding surface are substantially coplanar;
the second waveguide upper cladding surface and the second structural upper cladding surface are substantially coplanar; and
the first and second waveguide upper cladding surfaces are positioned against one another upon assembly of the first and second planar waveguides with the first and second structural upper cladding surfaces positioned against one another.

8. The method of claim 1, further comprising:
a second additional area of first core material disposed within the first cladding, the additional areas of first core material being disposed on opposite sides of the first waveguide core, each of the additional areas of first core material comprising an elongated area running substantially parallel to and laterally spaced apart from the first waveguide core, the additional areas of first core material forming a corresponding first pair of structural upper cladding surfaces substantially parallel to the first substantially flat waveguide upper cladding surface; and
a second additional area of second core material disposed within the second cladding, the additional areas of second core material being disposed on opposite sides of the second waveguide core, each of the additional areas of second core material comprising an elongated area running substantially parallel to and laterally spaced apart from the second waveguide core, the additional areas of second core material forming a corresponding second pair of structural upper cladding surfaces substantially parallel to the second substantially flat waveguide upper cladding surface,
wherein the first and second pairs of structural upper cladding surfaces are positioned against one another upon assembly of the first and second planar waveguides with the corresponding waveguide upper cladding surfaces facing one another.

9. The method of claim 8, wherein the first waveguide upper cladding surface and the first pair of structural upper cladding surfaces are non-coplanar, thereby positioning, upon assembly of the first and second planar waveguides, the first and second waveguides with their corresponding substantially flat upper waveguide cladding surfaces spaced-apart from one another.

10. The method of claim 8, wherein the first waveguide upper cladding surface and the first pair of structural upper cladding surfaces are substantially coplanar.

11. The method of claim 8, wherein
the first waveguide upper cladding surface and the first pair of structural upper cladding surfaces are substantially coplanar;
the second waveguide upper cladding surface and the second pair of structural upper cladding surfaces are substantially coplanar; and
the first and second waveguide upper cladding surfaces are positioned against one another upon assembly of the first and second planar waveguides with the first and second pairs of structural upper cladding surfaces positioned against one another.

12. The method of claim 8, wherein
the pair of additional areas of first core material are laterally spaced apart from the first waveguide core by a distance at least as large as the width of the first waveguide core; and
the pair of additional areas of second core material are laterally spaced apart from the second waveguide core by a distance at least as large as the width of the second waveguide core.

13. The method of claim 8, further comprising substantially filling a volume between the respective upper cladding surfaces of the assembled first and second waveguides with embedding material, the volume being disposed laterally between the engaged pairs of substantially flat structural upper cladding surfaces of the assembled waveguides.

14. The method of claim 8, at least one elongated area of core material having therethrough at least one gap, the gap providing a flow channel for a liquid precursor for an embedding medium to flow into and substantially fill a volume between the respective upper cladding surfaces of the assembled first and second waveguides, the volume being disposed laterally between the engaged pairs of substantially flat structural upper cladding surfaces.

15. The method of claim 1, wherein index contrast between the first waveguide core or the second waveguide core and the corresponding cladding is less than about 5%.

16. The method of claim 15, wherein the first waveguide core or the second waveguide core comprises doped silica and the corresponding cladding comprises silica or doped silica.

17. The method of claim 15, wherein the first waveguide core or the second waveguide core is less than about 1.5 µm in a vertical dimension and less than about 6 µm in a lateral dimension.

18. The method of claim 1, wherein index contrast between the first waveguide core or the second waveguide core and the corresponding cladding is greater than about 5%.

19. The method of claim 18, wherein the first waveguide core or the second waveguide core comprises silicon nitride or silicon oxynitride and the corresponding cladding material comprises silica or doped silica.

20. The method of claim 18, wherein the first waveguide core or the second waveguide core is less than about 200 nm in a vertical dimension and less than about 5 µm in a lateral dimension.

21. The method of claim 1, wherein the first cladding or the second cladding is less than about 1 µm thick over the transverse-coupled portion of the corresponding core.

22. The method of claim 1, wherein the first cladding or the second cladding is less than about 0.5 µm thick over the transverse-coupled portion of the corresponding core.

23. The method of claim 1, further comprising forming at least one additional area of core material within the first cladding or the second cladding, with a corresponding area of upper cladding surface, the corresponding area of the upper cladding surface forming a flow-director for an embedding medium applied to the first planar waveguide or the second planar waveguide.

24. The method of claim 1, further comprising substantially filling with embedding material a volume between respective upper cladding surfaces of the a first and second waveguides.

25. The method of claim 1, wherein the first waveguide core or the second waveguide core terminates at at least one end thereof, the terminating waveguide core tapering in the lateral dimension along the transverse-coupled portion thereof toward the terminated end.

26. A method for forming an optical apparatus, comprising:
    forming a first planar optical waveguide comprising a first waveguide core within a first cladding, an upper surface of the first cladding over the first core being substantially flat along at least a portion of the length thereof, thereby forming a first substantially flat waveguide upper cladding surface;
    forming a pair of additional areas of first core material disposed within the first cladding on opposite sides of the first waveguide core, each of the pair of additional areas of first core material comprising an elongated area running substantially parallel to and laterally spaced apart from the first waveguide core, the pair of additional areas of first core material forming a corresponding first pair of structural upper cladding surfaces substantially parallel to the first substantially flat waveguide upper cladding surface;
    forming a second planar optical waveguide comprising a second waveguide core within a second cladding, an upper surface of the second cladding over the second core being substantially flat along at least a portion of the length thereof, thereby forming a second substantially flat waveguide upper cladding surface;
    forming a pair of additional areas of second core material disposed within the second cladding on opposite sides of the second waveguide core, each of the pair of additional areas of second core material comprising an elongated area running substantially parallel to and laterally spaced apart from the second waveguide core, the pair of additional areas of second core material forming a corresponding second pair of structural upper cladding surfaces substantially parallel to the second substantially flat waveguide upper cladding surface;
    assembling the first and second planar optical waveguides together with at least portions of their corresponding substantially flat structural upper cladding surfaces positioned against one another and with at least portions of their corresponding waveguide upper cladding surfaces facing one another, thereby positioning the first and second planar optical waveguides for optical transverse-coupling between the first and second cores along corresponding transverse-coupled portions thereof; and
    substantially filling with embedding material a volume between the respective upper cladding surfaces of the assembled first and second waveguides, the volume being disposed between the engaged pairs of substantially flat structural upper cladding surfaces of the assembled waveguides.

27. A method for forming an optical apparatus, comprising:
    forming a first planar optical waveguide comprising a first waveguide core within a first cladding, an upper surface of the first cladding over the first core being substantially flat along at least a portion of the length thereof, thereby forming a first substantially flat waveguide upper cladding surface;
    forming a pair of additional areas of first core material disposed within the first cladding on opposite sides of the first waveguide core, each of the pair of additional areas of first core material comprising an elongated area running substantially parallel to and laterally spaced apart from the first waveguide core, the pair of additional areas of first core material forming a corresponding first pair of structural upper cladding surfaces substantially parallel to the first substantially flat waveguide upper cladding surface;
    forming a second planar optical waveguide comprising a second waveguide core within a second cladding, an upper surface of the second cladding over the second core being substantially flat along at least a portion of the length thereof, thereby forming a second substantially flat waveguide upper cladding surface;
    forming a pair of additional areas of second core material disposed within the second cladding on opposite sides of the second waveguide core, each of the pair of additional areas of second core material comprising an elongated area running substantially parallel to and laterally spaced apart from the second waveguide core, the pair of additional areas of second core material forming a corresponding second pair of structural upper cladding surfaces substantially parallel to the second substantially flat waveguide upper cladding surface;

forming at least one gap through at least one elongated area of core material, the gap providing a flow channel for a liquid precursor for an embedding medium to flow into and substantially fill a volume between the respective upper cladding surfaces of the assembled first and second waveguides, the volume being disposed laterally between the engaged pairs of substantially flat structural upper cladding surfaces; and assembling the first and second planar optical waveguides together with at least portions of their corresponding substantially flat structural upper cladding surfaces positioned against one another and with at least portions of their corresponding waveguide upper cladding surfaces facing one another, thereby positioning the first and second planar optical waveguides for optical transverse-coupling between the first and second cores along corresponding transverse-coupled portions thereof.

28. A method for forming an optical apparatus, comprising:

forming a first planar optical waveguide comprising a first waveguide core within a first cladding, an upper surface of the first cladding over the first core being substantially flat along at least a portion of the length thereof, thereby forming a first substantially flat waveguide upper cladding surface;

forming a second planar optical waveguide comprising a second waveguide core within a second cladding, an upper surface of the second cladding over the second core being substantially flat along at least a portion of the length thereof, thereby forming a second substantially flat waveguide upper cladding surface;

forming at least one additional area of core material within the first cladding or the second cladding, with a corresponding area of upper cladding surface, the corresponding area of the upper cladding surface forming a flow-director for an embedding medium applied to the first planar waveguide or the second planar waveguide; and assembling the first and second planar optical waveguides together with at least portions of their corresponding substantially flat waveguide upper cladding surfaces positioned facing one another, thereby positioning the first and second planar optical waveguides for optical transverse-coupling between the first and second cores along corresponding transverse-coupled portions thereof.

* * * * *

UNITED STATES PATENT AND TRADEMARK OFFICE
CERTIFICATE OF CORRECTION

| | | |
|---|---|---|
| PATENT NO. | : 7,136,564 B2 | Page 1 of 1 |
| APPLICATION NO. | : 11/298264 | |
| DATED | : November 14, 2006 | |
| INVENTOR(S) | : Blauvelt et al. | |

It is certified that error appears in the above-identified patent and that said Letters Patent is hereby corrected as shown below:

On the Title Page

(56) References Cited  
U.S. Patent Documents  
2003/0039439 A1

Delete "Deliwata",  
Insert --Deliwala--

(56) References Cited  
U.S. Patent Documents  
2003/0235371 A1

Delete "Shimeda",  
Insert --Shimada--

Column 17, line 50, Claim 24

Delete "the a first",  
Insert --the assembled first--

Signed and Sealed this

Twelfth Day of June, 2007

JON W. DUDAS  
*Director of the United States Patent and Trademark Office*